US009510342B2

(12) United States Patent
Seo et al.

(10) Patent No.: US 9,510,342 B2
(45) Date of Patent: *Nov. 29, 2016

(54) METHOD AND DEVICE FOR TRANSMITTING AND RECEIVING DOWNLINK CONTROL CHANNEL FOR CONTROLLING INTER-CELL INTERFERENCE IN WIRELESS COMMUNICATION SYSTEM

(71) Applicant: LG ELECTRONICS INC., Seoul (KR)

(72) Inventors: Inkwon Seo, Anyang-si (KR); Hanbyul Seo, Anyang-si (KR); Kijun Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/077,749

(22) Filed: Mar. 22, 2016

(65) Prior Publication Data

US 2016/0205673 A1    Jul. 14, 2016

Related U.S. Application Data

(63) Continuation of application No. 14/828,940, filed on Aug. 18, 2015, now Pat. No. 9,332,540, which is a continuation of application No. 13/884,387, filed as application No. PCT/KR2011/008543 on Nov. 10, 2011, now Pat. No. 9,144,069.

(60) Provisional application No. 61/412,797, filed on Nov. 12, 2010.

(51) Int. Cl.
*H04Q 9/00* (2006.01)
*H04W 72/04* (2009.01)
(Continued)

(52) U.S. Cl.
CPC .......... *H04W 72/042* (2013.01); *H04J 11/005* (2013.01); *H04L 5/0007* (2013.01); *H04L 65/4076* (2013.01); *H04W 72/0413* (2013.01); *H04W 72/0446* (2013.01)

(58) Field of Classification Search
CPC .......................... H04W 72/042; H04J 71/005
USPC .......................... 370/241, 252, 329; 455/63.1
See application file for complete search history.

(56) References Cited

U.S. PATENT DOCUMENTS

2012/0063321 A1*  3/2012  Chandrasekhar ..... H04L 1/1896
                                                    370/241
2012/0082052 A1*  4/2012  Oteri .................... H04W 24/10
                                                    370/252
(Continued)

FOREIGN PATENT DOCUMENTS

KR    10-2008-0112902     12/2008

OTHER PUBLICATIONS

3rd Generation Partnership Project (3GPP), "Technical Specification Group Radio Access Network; Evolved Universal Terrestrial Radio Access (E-UTRA); Further advancements for E-UTRA physical layer aspects (Release 9)," 3GPP TR 36.814 V9.0.0, Mar. 2010, 104 pages (relevant sections: 5 and 7).

(Continued)

Primary Examiner — Wanda Z Russell
(74) Attorney, Agent, or Firm — Lee, Hong, Degerman, Kang & Waimey; Jonathan Kang; Richard Salfelder

(57) ABSTRACT

The present invention relates to a wireless communication system, and more particularly, to a method and device for transmitting and receiving a downlink control channel for controlling inter-cell interference in a wireless communication system. An embodiment of the present invention provides a method for transmitting a downlink control channel from a base station to a terminal, and the method may comprise: a step of determining whether a downlink subframe is of a first type or a second type; and a step in which if the downlink subframe is of the first type, the number of OFDM symbols for transmitting the downlink control channel is set to a preset value (N), and the downlink control channel is transmitted using N OFDM symbols.

10 Claims, 19 Drawing Sheets

(51) Int. Cl.
*H04J 11/00* (2006.01)
*H04L 5/00* (2006.01)
*H04L 29/06* (2006.01)

(56) References Cited

U.S. PATENT DOCUMENTS

2012/0329400 A1* 12/2012 Seo .................. H04J 11/005
 55/63.1
2013/0136028 A1* 5/2013 Gan .................... H04W 24/02
 370/252
2013/0208686 A1* 8/2013 Zhang ................. H04J 11/0056
 370/329
2015/0358947 A1 12/2015 Seo et al.

OTHER PUBLICATIONS

3rd Generation Partnership Project (3GPP), "Technical Specification Group Radio Access Network; Evolved Universal Terrestrial Radio Access (E-UTRA); Physical layer procedures (Release 9)," 3GPP TS 36.213 V92.0. Jun. 2010, 80 pages (relevant sections: 7 and 9).

Dahlman, et al., "3G Evolution: LTE for Mobile Broadband, 2nd Edition," Elsevier Korea L.L.C., Translated Edition ISBN 9788972838630, Apr. 2010, 11 pages (relevant sections: 11.3 and 11.4).

PCT International Application No. PCT/KR2011/008543, Written Opinion of the International Searching Authority dated May 17, 2012, 18 pages.

* cited by examiner

FIG. 6
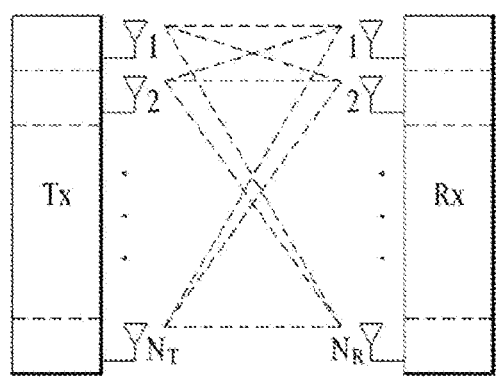
(a)
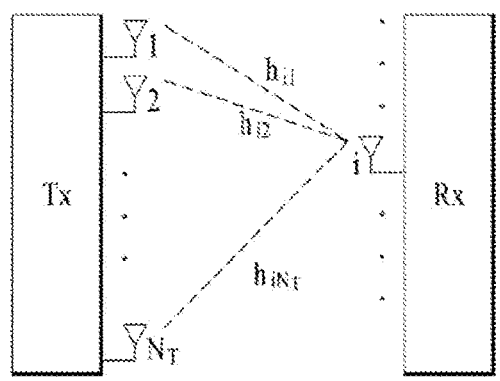
(b)

FIG. 7
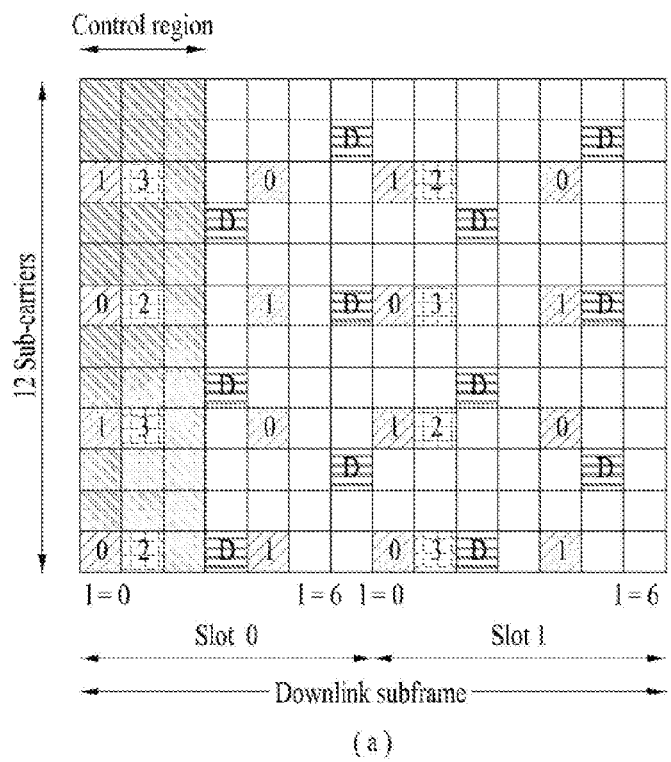
(a)
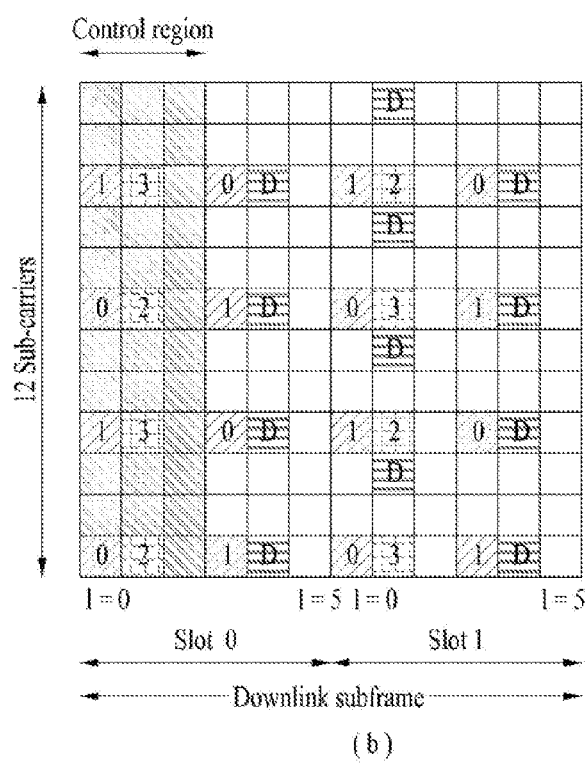
(b)

METHOD AND DEVICE FOR TRANSMITTING AND RECEIVING DOWNLINK CONTROL CHANNEL FOR CONTROLLING INTER-CELL INTERFERENCE IN WIRELESS COMMUNICATION SYSTEM

CROSS-REFERENCE TO RELATED APPLICATIONS

This application is a continuation of U.S. patent application Ser. No. 14/828,940, filed on Aug. 18, 2015, now U.S. Pat. No. 9,332,540, which is a continuation of U.S. patent application Ser. No. 13/884,387, filed on May 9, 2013, now U.S. Pat. No. 9,144,069, which is the National Stage filing under 35 U.S.C. 371 of International Application No. PCT/KR2011/008543, filed on Nov. 10, 2011, and also claims the benefit of U.S. Provisional Application No. 61/412,797, filed on Nov. 12, 2010, the contents of all of which are hereby incorporated by reference herein in their entireties.

FIELD OF THE INVENTION

The present invention relates to a wireless communication system, and more particularly, to a method and apparatus for transceiving a downlink control channel for inter-cell interference coordination in a wireless communication system.

DESCRIPTION OF THE RELATED ART

FIG. 1 is a diagram for a heterogeneous network wireless communication system 100 including a macro base station and a micro base station. In this disclosure, a terminology named a heterogeneous network means a network having a macro base station 110 and micro base stations 121 and 122 coexist therein despite using the same RAT (radio access technology).

The macro base station 110 has a wide coverage and a high transmission power and means a general base station in a wireless communication system. The macro base station 110 may be called a macro cell.

Each of the micro base stations 121 and 122 may be called such a name as a micro cell, a pico cell, a femto cell, a home eNB (HeNB), a relay and the like. Each of the micro base stations 121 and 122 is a small-scale version of the macro base station 110 and can independently operate by performing most of the functions of the macro base station 110. And, each of the micro base stations 121 and 122 may include a base station of an overlay type that is installed within an area covered by the macro base station. Moreover, each of the micro base stations 121 and 122 may include a base station of a non-overlay type that can be installed in a radio shadow area not covered by the macro base station. Each of the micro base stations 121 and 122 can accommodate a smaller number of user equipments with a coverage and transmission power smaller than those of the macro base station 110.

One user equipment 131 may be directly served by the macro base station 110 [hereinafter such a user equipment shall be called a macro user equipment (macro-UE)]. Another user equipment 132 may be served by the micro base station 122 [hereinafter such a user equipment shall be called a micro user equipment (micro-UE)]. Occasionally, the user equipment 132 existing within the coverage of the micro base station 122 may be served by the macro base station 110.

Micro base stations may be classified into two kinds of types depending on whether restriction is put on an access by a user equipment. A firstfirst type corresponds to a CSG (closed subscriber group) micro base station. And, a second type corresponds to an OSC (open subscriber group) micro base station. The CSG micro base station can serve specific access-granted user equipments only, while the OSG micro base station can serve all user equipments without separate access restriction.

Meanwhile, PDCCH (physical downlink control channel) is the channel that carries control information provided to a user equipment by a base station. Information indicating that PDCCH is carried on a prescribed number of time units (e.g., OFDM (orthogonal frequency division multiplexing) symbol(s), etc.) in a downlink subframe can be provided to a user equipment by a base station through PCFICH (physical control format indicator channel).

SUMMARY OF THE INVENTION

When a user equipment served by a macro base station in a heterogeneous network mentioned in the foregoing description is located close to a micro base station, a strong downlink (DL) signal from the micro base station may cause interference on a DL signal received from a macro base station by a macro user equipment. And, a DL signal from a macro base station may make storing interference with a user equipment served by a micro base station. Similarly, inter-cell interference may be generated in uplink. To prevent this inter-cell interference, it is able to consider a method of preventing interference on an interference-given cell (hereinafter named a victim cell) by blocking a transmission of an interference-giving cell (hereinafter named an aggressor cell) on some resource elements.

Thus, even if the inter-cell interference coordinating scheme is applied, it is unable to block a transmission of a prescribed reference signal (e.g., a cell-specific reference signal (CRS)) essential to user equipments served by an aggressor cell. Hence, the reference signal of the aggressor cell still causes interference to a victim cell. Particularly, even if the inter-cell interference coordinating scheme is applied, it may happen that an aggressor cell causes interference to PCFICH of a victim cell, whereby performance of PDCCH decoding in a user equipment of the victim cell may be considerably lowered. If the PDCCH decoding performance is degraded, UL/DL (uplink/downlink) scheduling is not correctly performed, whereby overall performance of a network can be considerably lowered.

The technical task of the present invention is to provide a method of transceiving a downlink control channel (particularly, PCFICH, PDCCH, etc.) accurately and efficiently with respect to inter-cell interference coordination.

Technical tasks obtainable from the present invention are non-limited the above-mentioned technical task. And, other unmentioned technical tasks can be clearly understood from the following description by those having ordinary skill in the technical field to which the present invention pertains.

To achieve these and other advantages and in accordance with the purpose of the present invention, as embodied and broadly described, a method of transmitting a downlink control channel, which is transmitted to a user equipment by a base station, according to one embodiment of the present invention may include the steps of determining whether a downlink subframe corresponds to a firstfirst type subframe or a second type subframe, setting the number of OFDM (orthogonal frequency division multiplexing) symbols used for a transmission of the downlink control channel to a predefined number (N) if the downlink subframe corresponds to the firstfirst type subframe, and transmitting the downlink control channel on the OFDM symbols amounting to a number equal to the N.

To further achieve these and other advantages and in accordance with the purpose of the present invention, a base station, which transmits a downlink control channel, according to another embodiment of the present invention may include a receiving module configured to receive an uplink signal from a user equipment, a transmitting module configured to transmit a downlink signal to the user equipment, and a processor configured to control the base station including the receiving module and the transmitting module, the processor configured to determine whether a downlink subframe corresponds to a firstfirst type subframe or a second type subframe, the processor configured to set the number of OFDM (orthogonal frequency division multiplexing) symbols used for a transmission of the downlink control channel to a predefined number (N) if the downlink subframe corresponds to the firstfirst type subframe, the processor configured to transmit the downlink control channel on the OFDM symbols amounting to a number equal to the N.

The following matters may be applicable in common to the above-mentioned embodiments of the present invention.

Preferably, information on the number of the OFDM symbols used for the transmission of the downlink control channel may not be transmitted in the downlink subframe corresponding to the firstfirst type subframe.

Preferably, if the downlink subframe corresponds to the second type subframe, the base station may transmit information on the number of the OFDM symbols used for the transmission of the downlink control channel via PCFICH (physical control format indicator channel) and may transmit the downlink control channel on the OFDM symbols amounting the a number equal to the information transmitted via the PCFICH.

Preferably, the firstfirst type subframe may include a subframe having an inter-cell interference coordination performed thereon by a neighboring cell and the second type subframe may include a subframe having the inter-cell interference coordination not performed thereon by the neighboring cell. More preferably, the inter-cell interference coordination performed subframe may include the subframe configured by the neighboring cell as one of ABS (almost blank subframe), MBSFN (multicast broadcast single frequency network) subframe or ABS-with-MBSFN subframe.

Preferably, the downlink control channel may include a PDCCH (physical downlink control channel).

To further achieve these and other advantages and in accordance with the purpose of the present invention, a method of receiving a downlink control signal, which is received by a user equipment from a base station, according to a further embodiment of the present invention may include the steps of measuring a power of a signal received from each of a serving cell and a neighboring cell, calculating a difference value resulting from subtracting the power of the signal received from the neighboring cell from the power of the signal received from the serving cell, comparing the difference value to a prescribed reference value, if the difference value is equal to or smaller than the prescribed reference value, assuming that the number of OFDM (orthogonal frequency division multiplexing) symbols used for a transmission of the downlink control channel from the serving cell as a predefined value (N), and decoding the downlink control channel on the OFDM symbols amounting to a number equal to the N.

To further achieve these and other advantages and in accordance with the purpose of the present invention, a user equipment, which receives a downlink control channel, according to another further embodiment of the present invention may include a receiving module configured to receive a downlink signal from a base station, a transmitting module configured to transmit an uplink signal to the base station, and a processor configured to control the user equipment including the receiving module and the transmitting module, the processor configured to measure a power of a signal received from each of a serving cell and a neighboring cell, the processor configured to calculate a difference value resulting from subtracting the power of the signal received from the neighboring cell from the power of the signal received from the serving cell, the processor configured to compare the difference value to a prescribed reference value, the processor configured to assume that the number of OFDM (orthogonal frequency division multiplexing) symbols used for a transmission of the downlink control channel from the serving cell as a predefined value (N) if the difference value is equal to or smaller than the prescribed reference value, the processor configured to decode the downlink control channel on the OFDM symbols amounting to a number equal to the N.

The following matters may be applicable in common to the above-mentioned embodiments of the present invention.

Preferably, if the difference value is greater than the prescribed reference value, the user equipment obtains information on the number of the OFDM symbols used for the transmission of the downlink control channel by decoding PCFICH (physical control format indicator channel) from the serving cell and may decode the downlink control channel on the OFDM symbols amounting to a number equal to the information obtained via the PCFICH.

Preferably, the prescribed reference value may be determined based on an SINR (signal-to-interference plus noise ratio) meeting a decoding condition of the PCFICH from the serving cell. Preferably, the prescribed reference value may be determined based on a reception power difference value for determining whether to operate a handover. More preferably, the prescribed reference value may be set to either a value higher than a reception power difference value for determining whether to operate a handover into the neighboring cell from the serving cell in a range expansion area of the serving cell or a value lower than a reception power difference value for determining whether to operate the handover into the neighboring cell from the serving cell in a range expansion area of the neighboring cell Preferably, a result of measuring the power of the signal received from each of the serving cell and the neighboring cell may be reported to the base station.

Preferably, the downlink control channel may include a PDCCH (physical downlink control channel).

The above-mentioned general description of the present invention and the following details of the present invention are exemplary and may be provided for the additional description of the invention disclosed in claims.

According to the present invention, a method of transceiving a downlink control channel (particularly, PCFICH, PDCCH, etc.) accurately and efficiently with respect to inter-cell interference coordination can be provided.

Effects obtainable from the present invention are non-limited by the above mentioned effect. And, other unmentioned effects can be clearly understood from the following description by those having ordinary skill in the technical field to which the present invention pertains.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIG. 6 is a diagram for a configuration of a wireless communication system having multiple antennas.

FIG. 7 is a diagram of CRS and DRS patterns defined in the legacy 3GPP LTE system.

DETAILED DESCRIPTION OF THE PREFERRED EMBODIMENTS

Figure 1:
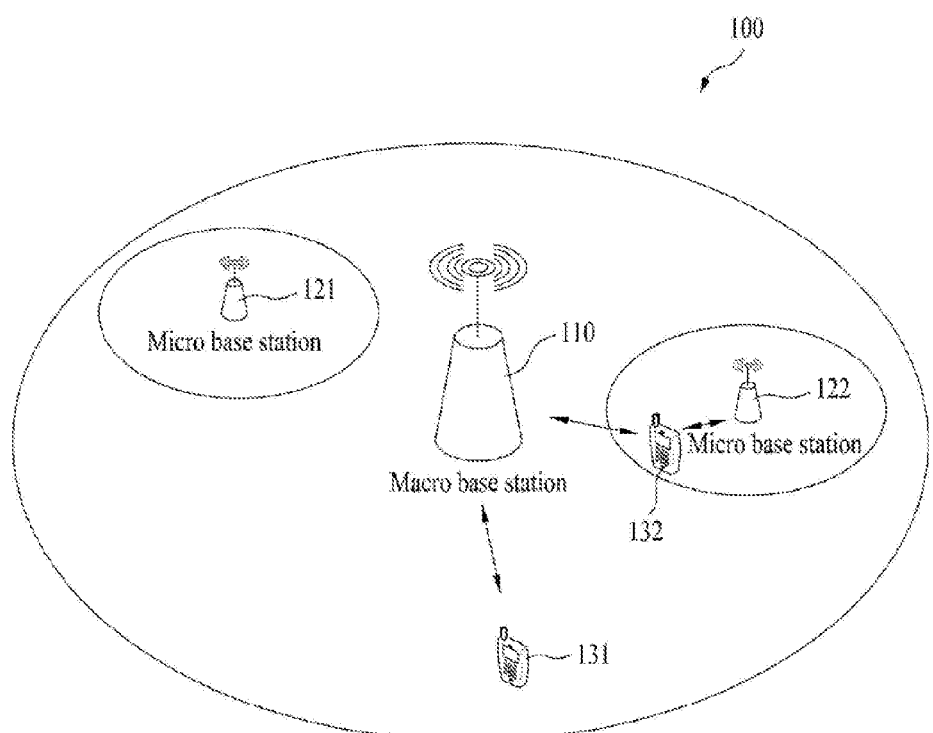
FIG. 1 is a diagram for a heterogeneous network wireless communication system.

First of all, the following embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, an embodiment of the present invention may be implemented by combining elements and/or features together in part. A sequence of operations explained for each embodiment of the present invention may be modifiable. Some configurations or features of one embodiment may be included in another embodiment or substituted with corresponding configurations or features of another embodiment.

In the present specification, embodiments of the present invention are described centering on the data transmission/reception relations between a base station and a terminal. In this case, the base station may be meaningful as a terminal node of a network which directly performs communication with the terminal. In this disclosure, a specific operation explained as performed by a base station may be performed by an upper node of the base station in some cases.

In particular, in a network constructed with a plurality of network nodes including a base station, it is apparent that various operations performed for communication with a terminal can be performed by a base station or other networks other than the base station. 'Base station (BS)' may be substituted with such a terminology as a fixed station, a Node B, an eNode B (eNB), an access point (AP) and the like. A relay may be substituted with such a terminology as a relay node (RN), a relay station (RS) and the like. And, 'terminal' may be substituted with such a terminology as a user equipment (UE), a mobile station (MS), a mobile subscriber station (MSS), a subscriber station (SS) and the like.

Specific terminologies used for the following description may be provided to help the understanding of the present invention. And, the use of the specific terminology may be modified into another form within the scope of the technical idea of the present invention.

Occasionally, to prevent the present invention from getting vaguer, structures and/or devices known to the public may be skipped or represented as block diagrams centering on the core functions of the structures and/or devices. Wherever possible, the same reference numbers will be used throughout the drawings to refer to the same or like parts in this specification.

Embodiments of the present invention may be supported by the disclosed standard documents of at least one of wireless access systems including IEEE 802 system, 3GPP system, 3GPP LTE and LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) is an evolved version of 3GPP LTE. WiMAX may be explained by IEEE 802.16e standard (e.g., WirelessMAN-OFDMA reference system) and advanced IEEE 802.16m standard (e.g., WirelessMAN-OFDMA advanced system). For clarity, the following description mainly concerns 3GPP LTE system or 3GPP LTE-A system, by which the technical idea of the present invention may be non-limited.

A structure of a downlink (DL) radio frame is described with reference to FIG. 2 as follows.

In a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

Figure 2:
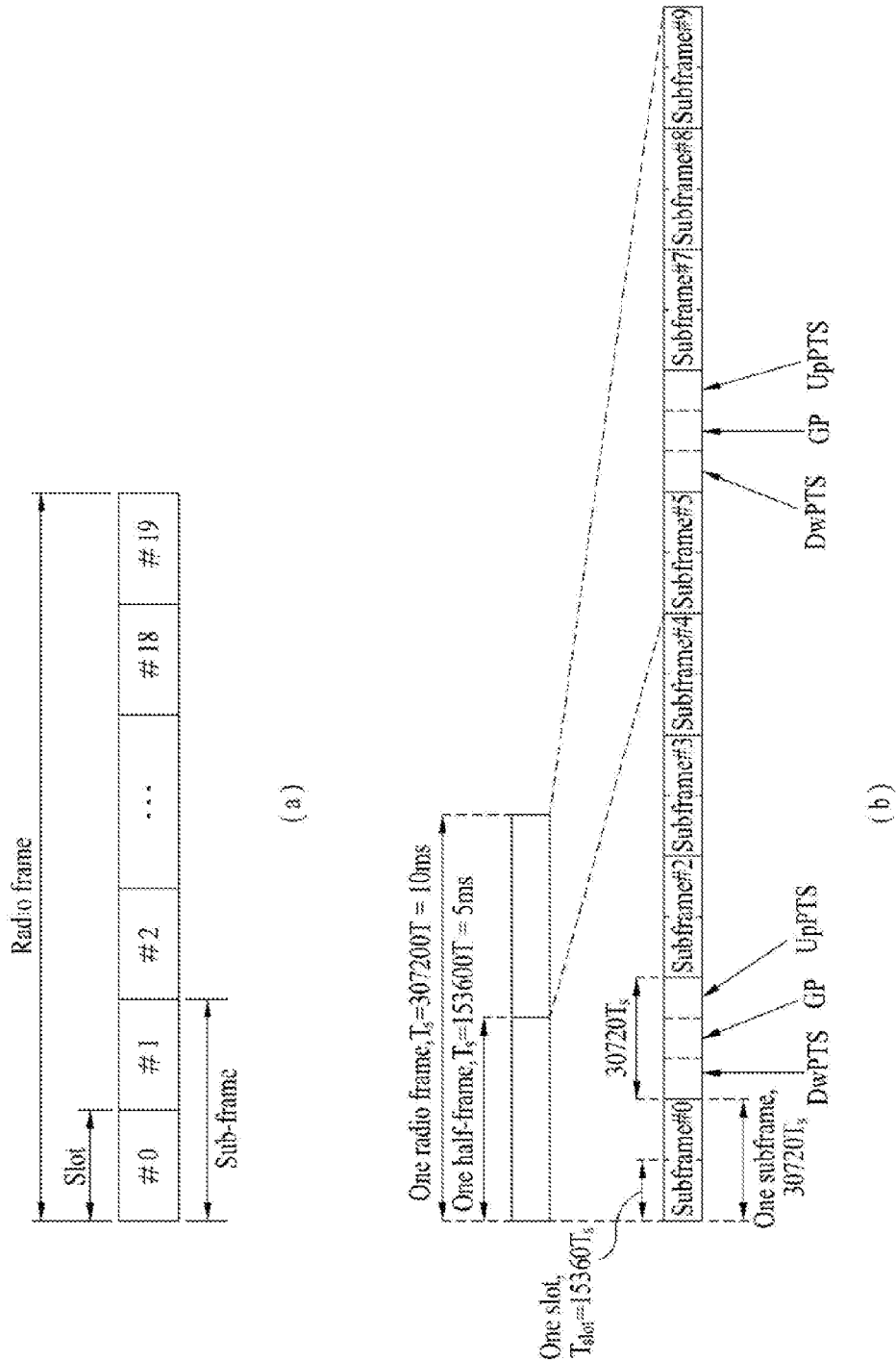
FIG. 2 is a diagram for a structure of a downlink radio frame.

FIG. 2 (a) is a diagram for a structure of a downlink radio frame of type 1. A DL (downlink) radio frame includes 10 subframes. Each of the subframes includes 2 slots. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain or may include a plurality of resource blocks (RBs) in frequency domain. Since 3GPP system uses OFDMA in downlink, OFDM symbol indicates one symbol duration. The OFDM symbol may be named SC-FDMA symbol or symbol duration. Resource block (RB) is a resource allocation unit and may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first 2 or 3 OFDM symbols of each subframe may be allocated to PDCCH (physical downlink control channel), while the rest of the OFDM symbols are allocated to PDSCH (physical downlink shared channel).

FIG. 2 (b) is a diagram for a structure of a downlink radio frame of type 2. A type-2 radio frame includes 2 half frames. Each of the half frame includes 5 subframes, DwPTS (downlink pilot time slot), GP (guard period) and UpPTS (uplink pilot time slot). And, one of the subframes includes 2 slots. The DwPTS is used for initial cell search, synchronization or channel estimation in a user equipment. The UpPTS is used for channel estimation in a base station and uplink transmission synchronization of a user equipment. The guard period is a period for eliminating interference generated in uplink due to multi-path delay of a downlink signal between uplink and downlink. Meanwhile, one subframe is constructed with 2 slots irrespective of a type of a radio frame.

The above-described structures of the radio frame are just exemplary. And, the number of subframes included in a radio frame, the number of slots included in the subframe and the number of symbols included in the slot may be modified in various ways.

Figure 3:
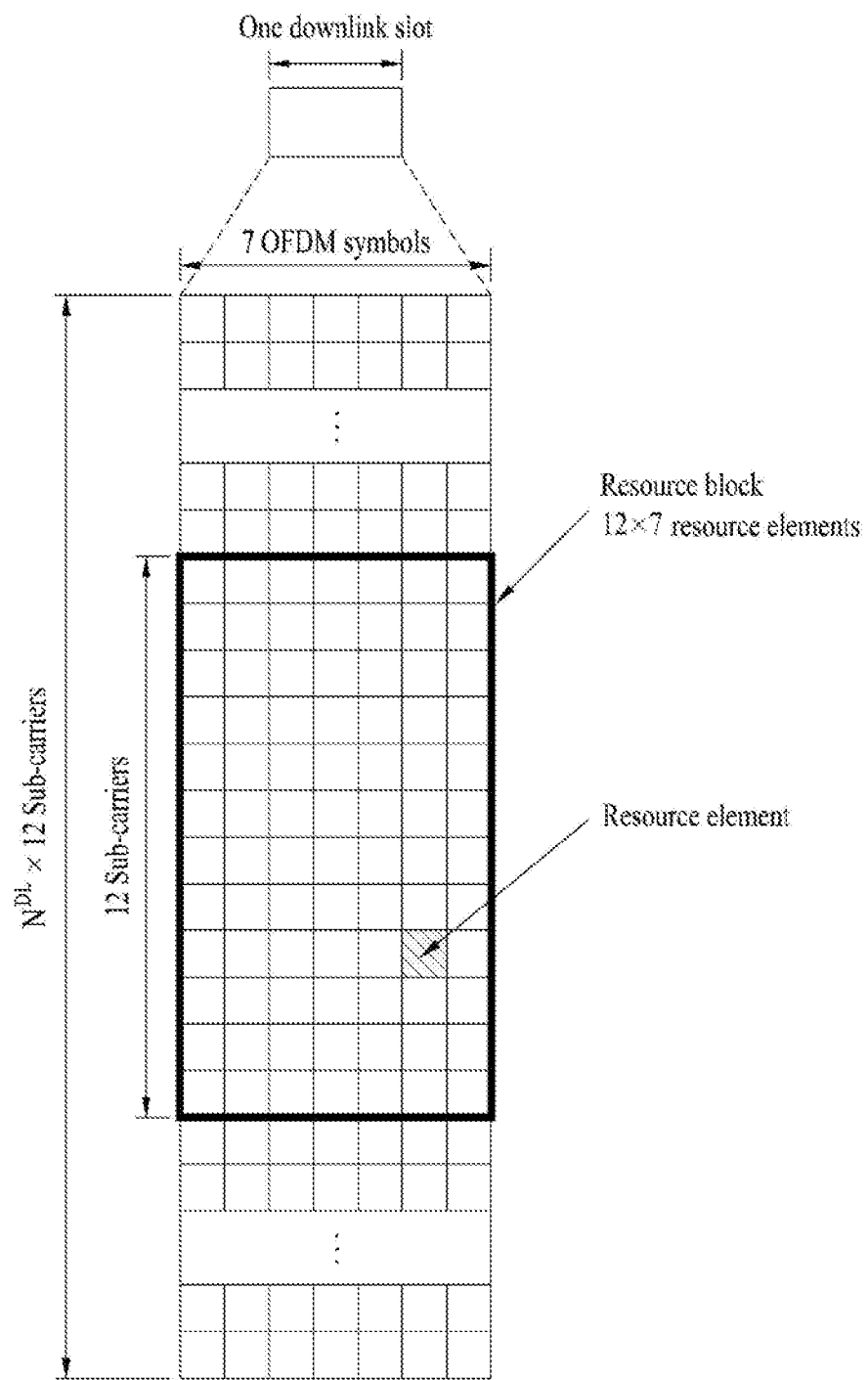
FIG. 3 is a diagram of a resource grid in a downlink slot.

FIG. 3 is a diagram for one example of a resource grid in a downlink (DL) slot. In the drawing, one DL slot may include 7 OFDM symbols in time domain and one resource block (RB) may include 12 subcarriers in frequency domain, by which the present invention may be non-limited. For instance, in case of a normal CP (cyclic prefix), one slot includes 7 OFDM symbols. Yet, in case of an extended CP (extended-CP), one slot may include 6 OFDM symbols. Each element on a resource grid may be called a resource element (RE). One resource block includes 12×7 resource elements. $N^{DL}$ indicates the number of resource blocks included in a DL slot. And, the value of the $N^{DS}$ may depend on a DL transmission bandwidth. A structure of UL slot may be identical to that of the DL slot.

Figure 4:
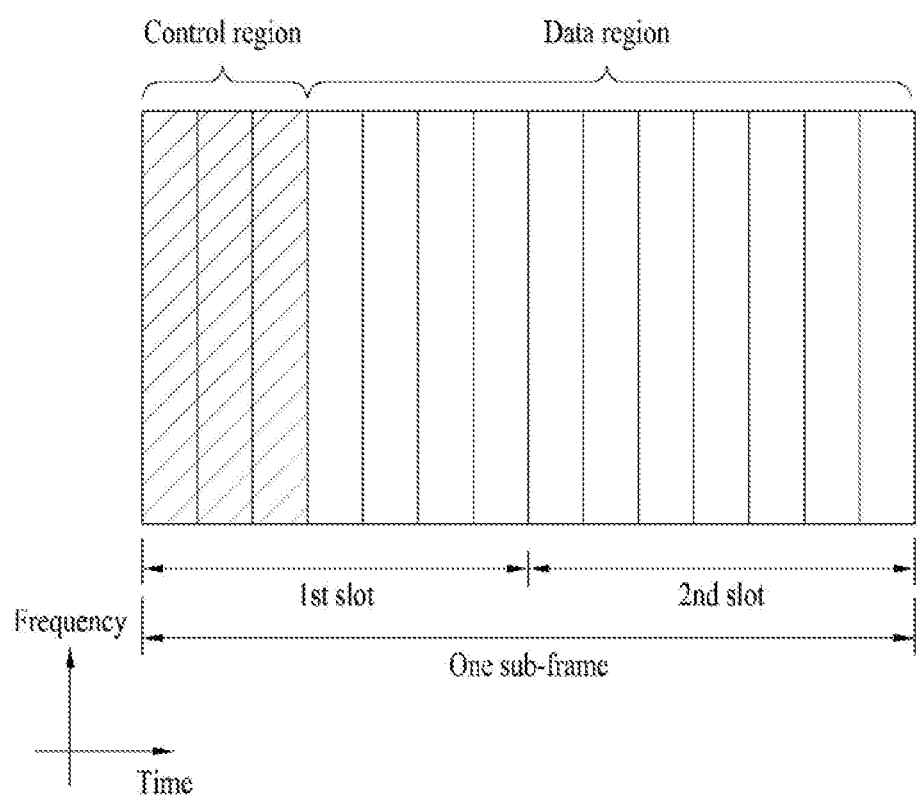
FIG. 4 is a diagram for one example of a structure of a downlink subframe.

FIG. 4 is a diagram for a structure of a downlink (DL) subframe. Maximum 3 OFDM symbols situated in a head part of a first slot of one subframe correspond to a control region to which a control channel is allocated. The rest of OFDM symbols correspond to a data region to which PDSCH (physical downlink shared channel) is allocated. DL control channels used by 3GPP LTE system may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and includes information on the number of OFDM symbols used for a transmission of a control channel within the subframe. The PHICH includes HARQ ACK/NACK signal in response to a UL transmission. Control information carried on PDCCH may be called downlink control information (DCI). The DCI may include UL or DL scheduling information or a UL transmission power control command for a random UE (user equipment) group. The PDCCH may include transmission format and resource allocation information of DL-SCH (downlink shared channel), resource allocation information on UL-SCH (uplink shared channel), paging information on PCH (paging channel), system information on DL-SCH, resource allocation of such an upper layer control message as a random access response transmitted on PDSCH, transmission power control command set for individual UEs within a random UE group, transmission power control information, activation of VoIP (voice over IP) and the like. A plurality of PDCCHs can be transmitted within the control region. A user equipment can monitor a plurality of the PDCCHs. The PDCCH is transmitted as an aggregation of at least one or more contiguous CCEs (control channel elements). The CCE is a logical allocation unit used to provide the PDCCH at a coding rate based on a radio channel status. The CCE may correspond to a plurality of REGs (resource element groups). A format of the PDCCH and the number of available PDCCH bits may be determined in accordance with correlation between the number of CCEs and a coding rate provided by the CCE. A base station determines a PDCCH format in accordance with a DCI which is to be transmitted to a user equipment and attaches a CRC (cyclic redundancy check) to control information. The CRC is masked with an identifier named RNTI (radio network temporary identifier) in accordance with an owner or usage of the PDCCH. For instance, if the PDCCH is provided for a specific user equipment, the CRC may be masked with an identifier (e.g., cell-RNTI (C-RNTI)) of the corresponding user equipment. In case that the PDCCH is provided for a paging message, the CRC may be masked with a paging indicator identifier (e.g., P-RNTI). If the PDCCH is provided for system information (particularly, for a system information block (SIC)), the CRC may be masked with a system information identifier and a system information RNTI (SI-RNTI). In order to indicate a random access response to a transmission of a random access preamble of a user equipment, the CRC may be masked with RA-RNTI (random access-RNTI).

Figure 5:
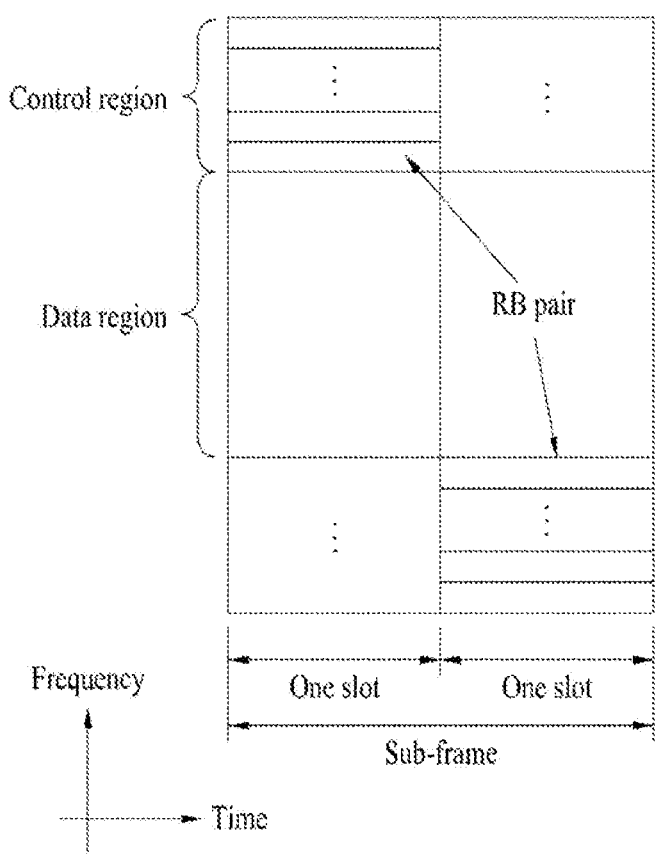
FIG. 5 is a diagram for a structure of an uplink subframe.

FIG. 5 is a diagram for a structure of an uplink (UL) subframe. A UL subframe may be divided into a control region and a data region in frequency domain. A physical UL control channel (PUCCH) including UL control information may be allocated to the control region. And, a physical UL shared channel (PUSCH) including user data may be allocated to the data region. In order to maintain single carrier property, one user equipment does not transmit PUCCH and PUSCH simultaneously. PUCCH for one user equipment may be allocated to a resource block pair (RB pair) in subframe. Resource blocks belonging to the resource block pair may occupy different subcarriers for 2 slots. Namely, a resource block pair allocated to PUCCH is frequency-hopped on a slot boundary.

Modeling of Multi-Antenna (MIMO) System

FIG. 6 is a diagram for a configuration of a wireless communication system including multiple antennas.

Referring to FIG. 6 (a), if the number of transmitting antennas is incremented into $N_T$ and the number of receiving antennas is incremented into $N_R$, theoretical channel transmission capacity is increased in proportion to the number of antennas unlike the case that a transmitter or receiver uses a plurality of antennas. Hence, a transmission rate may be enhanced and frequency efficiency may be remarkably raised. The transmission rate according to the increase of the channel transmission capacity may be theoretically raised by an amount resulting from multiplying a maximum transmission rate $R_0$ of the case of using a single antenna by a rate increasing rate $R_i$.

$$R_i = \min(N_T, N_R) \quad \text{[Formula 1]}$$

For instance, in an MIMO communication system, which uses 4 transmitting antennas and 4 receiving antennas, it may be able to obtain a transmission rate 4 times higher than that of a single antenna system. After this theoretical capacity increase of the MIMO system has been proved in the middle of the 90's, many efforts are ongoing to be made to various techniques for drive it into substantial data rate improvement. Some of these techniques are already adopted as standards for various wireless communications such as 3G mobile communications, a next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. Assume that $N_T$ transmitting antennas and $N_R$ receiving antennas exist in this system.

First of all, a transmission signal is explained. If there are $N_T$ transmitting antennas, $N_T$ maximum transmittable informations exist. Hence, the transmission information may be represented as follows.

$$s = [s_1, s_2, \ldots, s_{N_T}]^T \quad \text{[Formula 2]}$$

Meanwhile, transmission power can be set different for each transmission information $s_1, s_2, \ldots s_{N_T}$. If the respective transmission powers are set to $P_1, P_2, \ldots P_{N_T}$, the transmission power adjusted transmission information may be represented as follows.

$$\hat{s} = [\hat{s}_1, \hat{s}_2, \ldots, \hat{s}_{N_T}]^T = [P_1 s_1, P_2 s_2, \ldots P_{N_T} s_{N_T}]^T \quad \text{[Formula 3]}$$

And, $\hat{S}$ may be represented as follows using a transmission power diagonal matrix P.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Formula 4]}$$

If a weight matrix W is applied to the transmission power adjusted transmission information vector $\hat{S}$, a case of configuring $N_T$ transmission signals $x_1, x_2, \ldots x_{N_T}$ actually transmitted can be taken into consideration as follows. In this case, the weight matrix W plays a role in properly distributing the transmission information to each antenna according to a transmission channel status and the like. The $x_1, x_2, \ldots x_{N_T}$ may be represented using a vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Formula 5]}$$

In Formula 5, $w_{ij}$ indicates a weight between an $i^{th}$ transmitting antenna and $j^{th}$ information. And, W may be called a precoding matrix.

When $N_R$ receiving antennas exist, if reception signals of the receiving antennas are set to $y_1, y_2, \ldots y_{N_R}$, a reception signal vector can be represented as follows.

$$y = [y_1, y_2, \ldots, y_{N_R}]^T \quad \text{[Formula 6]}$$

If a channel is modeled in MIMO wireless communication system, the channel can be represented as an index of a transmitting antenna and an index of a receiving antenna. A channel between a transmitting antenna j and a receiving antenna i may be represented as $h_{ij}$. In the $h_{ij}$, it should be noted that a receiving antenna index is followed by a transmitting antenna index in order of index.

FIG. 6 (b) shows a channel to a receiving antenna i from each of $N_T$ transmitting antennas. These channels may be represented as a vector or matrix in a manner of tying the channels b together. Referring to FIG. 6 (b), the channels between the receiving antenna i and the $N_T$ transmitting antennas can be represented as follows.

$$h_i^T = [h_{i1}, h_{i2}, \ldots h_{iN_T}] \quad \text{[Formula 7]}$$

Hence, al the channels arriving from $N_T$ transmitting antennas to $N_R$ relieving antennas may be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \quad \text{[Formula 8]}$$

In an actual channel, a transmission signal passes through a channel matrix H and then has AWGN (additive white Gaussian noise) added thereto. If white noses $n_1, n_2, \ldots n_{N_R}$ respectively added to $N_R$ receiving antennas, the white noises $n_1, n_2, \ldots n_{N_R}$ can be represented as follows.

$$n = [n_1, n_2, \ldots, n_{N_R}]^T \quad \text{[Formula 9]}$$

Hence, the reception signal vector may be expressed as follows through the above-mentioned formula modeling.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{1N_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n \quad \text{[Formula 10]}$$

Meanwhile, the number of rows/columns of a channel matrix H indicating a channel state is dependent on the number of transmitting/receiving antennas. The number of rows in the channel matrix H is equal to the number $N_R$ of the receiving antennas. The number of columns in the channel matrix H is equal to the number $N_T$ of the transmitting antennas. In particular, the channel matrix H becomes $N_R \times N_T$ matrix.

A rank of matrix is defined as a minimum one of the number of independent rows and the number of independent columns. Hence, it may be impossible for a rank of matrix to become greater than the number of rows or columns. A rank (rank (H)) of a channel matrix H is restricted to the following.

$$\text{Rank}(H) \leq \min(N_T, N_R) \quad \text{[Formula 11]}$$

For another definition of a rank, when Eigen value decomposition is performed on a matrix, a rank may be defined as the number of Eigen values except 0. Similarly, for a further definition of a rank, when singular value decomposition is performed, a rank may be defined as the number of singular values except 0. Hence, the physical meaning of a rank in a channel matrix may be regarded as a maximum number for sending different informations on a given channel.

Reference Signal (RS)

When a packet is transmitted in a wireless communication system, since the transmitted packet is transmitted on a radio channel, signal distortion may occur in the course of the transmission. In order for a receiving side to correctly receive the distorted signal, distortion in a received signal should be corrected using channel information. In order to acquire the channel information, after a signal known to both a receiving side and a transmitting side has been transmitted, the channel information can be acquired with a degree of distortion on receiving the signal on a channel. This signal may be called a pilot signal or a reference signal.

In case of transmitting or receiving data using MIMO, a channel status between each transmitting antenna and each receiving antenna should be obtained to receive a correct signal. Hence, a separate reference signal needs to be present for each transmitting antenna.

Downlink reference signals may include a common reference signal (CRS) shared with all user equipments in a cell and a dedicated reference signal (DRS) for a specific user equipment only. By these reference signals, information for channel estimation and demodulation can be provided.

A receiving side (e.g., user equipment) estimates a state of a channel from CRS and may be able to feed back such an indicator related to a channel quality as CQI (Channel Quality Indicator), PMI (Precoding Matrix Index) and RI (Rank Indicator) to a transmitting side (e.g., base station). The CRS may be called a cell-specific reference signal. An RS related to feedback of such channel state information (CSI) as CQI/PMI/RI can be separately defined as CSI-RS.

Meanwhile, DRS may be transmitted on a corresponding RE if demodulation of data on PDSCH is necessary. A user equipment many be informed of a presence or non-presence of DRS by an upper layer. In particular, the user may be informed that the DRS is valid only if the corresponding PDSCH is mapped. The DRS may be called a UE-specific reference signal or a demodulation reference signal (DMRS).

FIG. 7 is a diagram to illustrate a pattern in which CRS and DRS defined by the legacy 3GPP LTE system (e.g., Release-8) are mapped on a downlink resource block. The downlink resource block, which is a unit for mapping a reference signal, may be represented as a unit of '1 subframe on time×12 subcarriers on frequency'. In particular, one resource block may have a length of 14 OFDM symbols on time in case of a normal CP [FIG. 7 (a)] or a length of 12 OFDM symbols in case of an extended CP [FIG. 7 (b)].

FIG. 7 shows a position of a reference signal on a resource block in a system having a base station support 4 transmitting antennas. In FIG. 7, resource elements (REs) denoted by 0, 1, 2 and 3 indicate positions of CRS for antenna port indexes 0, 1, 2 and 3, respectively. Meanwhile, a resource element denoted by 'D' in FIG. 7 indicates a position of DRS.

In the following description, CRS is explained in detail.

First of all, CRS is used to estimate a channel of a physical antenna stage. The CRS is a reference signal receivable in common by all user equipments (UEs) in a cell and is distributed over a whole band. The CRS may be used for the purpose of channel state information (CSI) acquisition and data demodulation.

The CRS may be defined in various forms in accordance with antenna configuration. 3GPP LTE (e.g., Release-8) system supports various antenna configurations and a downlink signal transmitting side (e.g., base station) may have three kinds of antenna configurations including a single antenna, 2 transmitting antennas, 4 transmitting antennas and the like. In case that a base station performs a single antenna transmission, a reference signal for a single antenna port is arranged. In case that a base station performs 2-antenna transmission, reference signals for 2 antenna ports are arranged by time division multiplexing and/or frequency division multiplexing. In particular, the reference signals for 2 antenna ports are arranged on different time resources and/or different frequency resources to be discriminated from each other. In case that a base station performs 4-antenna transmission, reference signals for 4 antenna ports are arranged by TDM/FDM. Channel information estimated via CRS by a downlink signal receiving side (e.g., user equipment) may be used for demodulation of data transmitted by such a transmission scheme as Single Antenna Transmission, Transmit diversity, Closed-loop Spatial multiplexing, Open-loop Spatial multiplexing, Multi-User MIMO (MU-MIMO) and the like.

In case that MIMO is supported, when a reference signal is transmitted from a prescribed antenna port, a reference signal is carried at a resource element (RE) position designated by a reference signal pattern but no signal is carried at a resource element (RE) position designated for another antenna port.

A rule for mapping CRS on a resource block follows Formula 12.

$$k = 6m + (v + v_{shift}) \bmod 6 \quad [\text{Formula 12}]$$
$$l = \begin{cases} 0, N_{symb}^{DL} - 3 & \text{if } p \in \{0, 1\} \\ 1 & \text{if } p \in \{2, 3\} \end{cases}$$
$$m = 0, 1, \ldots, 2 \cdot N_{RB}^{DL} - 1$$
$$m' = m + N_{RB}^{max,DL} - N_{RB}^{DL}$$
$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$
$$v_{shift} = N_{ID}^{cell} \bmod 6$$

In Formula 12, k indicates a subcarrier index, l indicates a symbol index, and p indicates an antenna port index. $N_{symb}^{DL}$ indicates the number of OFDM symbols of one downlink slot, $N_{RB}^{DL}$ indicates the number of resource blocks allocated to downlink, $n_s$ indicates a slot index, and $N_{ID}^{cell}$ indicates a cell ID. 'mod' means a modulo operation. A position of a reference signal in frequency domain depends on a value of $V_{shift}$. Since the $V_{shift}$ value depends on a cell ID as well, a position of a reference signal has a frequency shift value different per cell.

In particular, a position in frequency domain may be set to differ by being shifted in order to raise channel estimation performance through CRS. For instance, if a reference signal is situated at every 3 subcarriers, a prescribed cell enables the reference signal to be arranged on a subcarrier of 3 k and another cell enables the reference signal to be arranged on a subcarrier of 3 k+1. In viewpoint of one antenna port, a reference signal is arranged by 6-RE interval (i.e., 6-subcarrier interval) in frequency domain and maintains 3-RE interval in frequency domain from an RE on which a reference signal for another antenna port is arranged.

For the CRS, power boosting may be applicable. In this case, the power boosting means that a reference signal is transmitted with higher power in a manner of bringing power not from an RE allocated for the reference signal but from another RE among resource elements (REs) of one OFDM symbol.

A reference signal position in time domain is arranged by a predetermined interval by setting symbol index (I) 0 of each slot to a start point. A time interval is defined different in accordance with a CP length. In case of a normal CP, a reference signal is situated at a symbol index 0 of a slot and a reference signal is situated at a symbol index 4 of the slot. Reference signals for maximum 2 antenna ports are defined on one OFDM symbol. Hence, in case of 4-transmitting antenna transmission, reference signals for antenna ports 0 and 1 are situated at symbol indexes 0 and 4 (or symbol indexes 0 and 3 in case of an extended CP) of a slot, respectively and reference signals for antenna ports 2 and 3 are situated at symbol index 1 of the slot. Yet, frequency positions of the reference signals for the antenna ports 2 and 3 may be switched to each other in a second slot.

In order to support spectral efficiency higher than that of the conventional 3GPP LTE (e.g., Release-8) system, it is able to design a system (e.g., LTE-A) system having an extended antenna configuration. For instance, the extended antenna configuration may include an 8-transmitting antenna configuration. In the system having the extended antenna configuration, it may be necessary to support user equipments operating in the conventional antenna configuration. Namely, it may be necessary to support backward compatibility. Hence, it may be necessary to support a reference signal pattern according to the conventional antenna configuration and it may be necessary to design a new reference signal pattern for an additional antenna configuration. In this case, if CRS for a new antenna port is added to a system having a conventional antenna configuration, it is disadvantageous in that a reference signal overhead rapidly increases to lower a data rate. In consideration of this matter, a separate reference signal (CSI-RS) for a channel state information (CSI) measurement for the new antenna port may be introduced into LTE-A (LTE-advanced) system evolved from 3GPP LTE.

In the following description, DRS is explained in detail.

First of all, DRS (or UE-specific reference signal) is a reference signal used for data demodulation. When MIMO transmission is performed, a precoding weight used for a specific user equipment in MIMO transmission is used for a reference signal as it is. Hence, when a user equipment receives a reference signal, it is able to estimate an equivalent channel having a transmission channel combined with the precoding weight transmitted from each transmitting antenna.

The conventional 3GPP LTE system (e.g., Release-8) supports maximum 4-transmitting antenna transmission and DRS for rank 1 beamforming is defined. The DRS for the rank 1 beamforming may be represented as a reference signal for antenna port index 5. A rule for mapping DRS on a resource block may follow Formula 13 and Formula 14. Formula 13 relates to a normal CP, while Formula 14 relates to an extended CP.

$$k = (k') \bmod N_{sc}^{RB} + N_{sc}^{Rb} \cdot n_{PRB} \quad [\text{Formula 13}]$$
$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$
$$l = \begin{cases} 3 & l' = 0 \\ 6 & l' = 1 \\ 2 & l' = 2 \\ 5 & l' = 3 \end{cases}$$
$$l' = \begin{cases} 0, 1 & \text{if } n_s \bmod 2 = 0 \\ 2, 3 & \text{if } n_s \bmod 2 = 1 \end{cases}$$
$$m' = 0, 1, \ldots, 3N_{RB}^{PDSCH} - 1$$
$$v_{shift} = N_{ID}^{cell} \bmod 3$$

-continued $$k = (k') \bmod N_{sc}^{RB} + N_{sc}^{RB} \cdot n_{PRB} \quad \text{[Formula 14]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Formula 13 and Formula 14, k indicates a subcarrier index, I indicates a symbol index, and p indicates an antenna port index. $N_{SC}^{RB}$ indicates a resource block size in frequency domain and may be represented as the number of subcarriers. $n_{PRB}$ indicates a physical resource block number. And, $N_{RB}^{PDSCH}$ indicates a bandwidth of a resource block of a corresponding PDSCH transmission. $n_s$ indicates a slot index and $N_{ID}^{cell}$ indicates a cell ID. Moreover, 'mod' means a modulo operation. A position of a reference signal in frequency domain depends on a value of $V_{shift}$. Since the $V_{shift}$ value depends on a cell ID as well, a position of a reference signal has a frequency shift value different per cell.

Meanwhile, in a system of LTE-A (LTE-Advanced) evolved from 3GPP LTE, MIMO of high order, multi-cell transmission, advanced MU-MIMO and the like are taken into consideration. In order to support efficient reference signal management and advanced transmission scheme, DRS based data demodulation is taken in to consideration. In particular, aside from DRS (antenna port index 5) for the rank 1 beamforming defined by the conventional 3GPP LTE (e.g., Release-8), in order to support data transmission via an added antenna, it is able to define DRS for at least two layers.

Cooperative Multi-Point (CoMP)

In accordance with the advanced system performance requirements of 3GPP LTE-A system, CoMP transmission/reception scheme (represented as one of co-MIMO (collaborative MIMO), network MIMO, etc.) has been proposed. The CoMP technology can enhance performance of a user equipment located at a cell edge and increase average sector throughput as well.

Generally, in a multi-cell environment having a frequency reuse factor set to 1, the performance and average sector throughput of the user equipment located at the cell edge may be lowered due to inter-cell interference (ICI). In order to reduce the ICI, a conventional LTE system has applied a method of providing an appropriate throughput performance to a user equipment located at a cell edge in an environment restricted by interference using a simple passive scheme such as FFR (fractional frequency reuse) via UE-specific power control and the like. Yet, reducing the ICI or reusing the ICI as a signal desired by a user equipment may be more preferable than lowering a frequency resource use per cell. To achieve this object, CoMP transmission schemes may be applicable.

The CoMP schemes applicable to a DL case may be mainly classified into joint processing (JP) scheme and coordinated scheduling/coordinated beamforming (CS/CB) scheme.

The JP scheme can use data at each point (e.g., base station) of CoMP cooperation unit. And, the CoMP cooperation unit may mean a set of base stations used for the cooperative transmission scheme. Moreover, the JP scheme may be classified into a joint transmission scheme and a dynamic cell selection scheme.

The joint transmission scheme means a scheme of transmitting PDSCH from a plurality of points (portion or all of CoMP cooperation unit) at a time. In particular, data transmitted to a single user equipment may be simultaneously from a plurality of transmission points. According to the joint transmission scheme, a quality of a coherently or non-coherently received signal can be improved and interference on another user equipment can be actively eliminated.

The dynamic cell selection scheme means the scheme of transmitting PDSCH from one point (of CoMP cooperation unit) at a time. In particular, data transmitted to a single user equipment at a specific timing point is transmitted from one point, the rest of points in the cooperation unit at that timing point do not perform data transmission to the corresponding user equipment, and a point of transmitting data to the corresponding user equipment may be dynamically selected.

According to the CS/CB scheme, CoMP cooperation units can cooperatively perform beamforming of data transmission to a single user equipment. In this case, although the data is transmitted from a serving cell only, user scheduling/beamforming may be determined by the coordination of cells of the corresponding CoMP cooperation unit.

Meanwhile, in case of uplink, coordinated multi-point reception means that a signal transmitted by coordination of a plurality of points geographically spaced apart from each other is received. CoMP schemes applicable to a case of uplink may be classified into joint reception (JR) and coordinated scheduling/coordinated beamforming (CS/CB).

The JR scheme means that a signal transmitted on PUSCH is received by a plurality of reception points. And, the CS/CB scheme means that user scheduling/beamforming is determined by coordination of cells of CoMP cooperation unit despite that PUSCH is received by one point only.

Sounding Reference Signal (SRS)

Sounding reference signal (SRS) is mainly used for a base station to perform a frequency-selective scheduling in UL by performing a channel quality measurement and is not associated with UL data and/or control information transmission, by which the sounding reference signal is non-limited. And, the SRS may be usable for the purpose of an improved power control or for the purpose of supporting various start-up functions of recently unscheduled user equipments. For example, the start-up functions may include an initial modulation and coding scheme (MCS), an initial power control for data transmission, a timing advance and frequency half-selective scheduling (e.g., a scheduling performed in a manner that a frequency resource is selectively allocated in a firstfirst slot of a subframe but that a frequency resource pseudo-randomly hops into another frequency in a second slot of the subframe), and the like.

The SRS may be usable for a DL channel quality measurement on the assumption that a radio channel is reciprocal between UL and DL. This assumption is particularly effective to a TDD (time division duplex) system in which a UL and a DL share the same frequency band with each other but are discriminated from each other in time domain.

A subframe, in which SRS is transmitted by a random user equipment within a cell, is indicated by cell-specific broadcast signaling. A 4-bit cell-specific parameter 'srsSubframeConfiguration' indicates 15 kinds of available configurations of a subframe for transmitting SRS within each radio frame. By this configuration, flexibility for adjusting an SRS overhead in accordance with a network arrangement scenario can be provided. A configuration of a remaining one ($16^{th}$) of the parameter is to completely switch off an SRS transmission within a cell and may be suitable for a cell that mainly serves fast user equipments for example.

Figure 8:
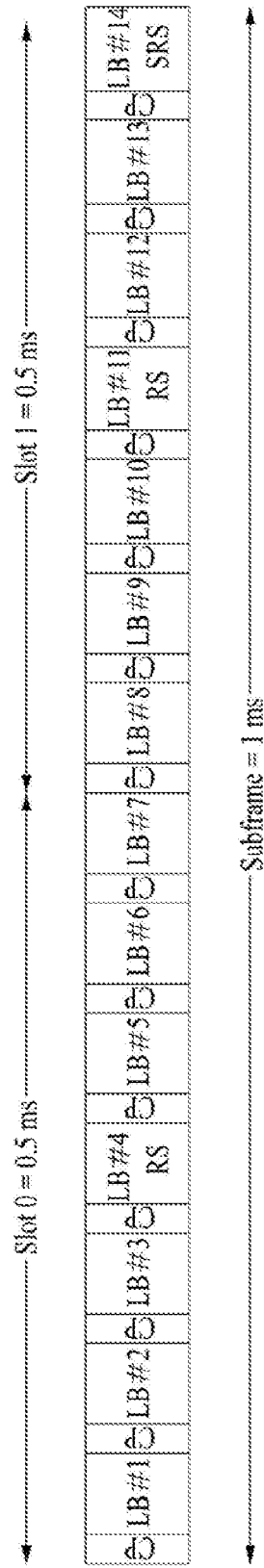
FIG. 8 is a diagram of an uplink subframe structure including SRS symbols.

Referring to FIG. 8, SRS is always transmitted on a last SC-FDMA symbol of a configured subframe. Hence, SRS and DMRS (demodulation reference signal) are located on different SC-FDMA symbols, respectively. PUSCH data transmission is not allowed to be performed on SC-FDMA symbol designated to SRS transmission. Hence, if a sounding overhead is highest (i.e., a case that an SRS transmission symbol exists in every subframe), it does not exceed about 7%.

Each SRS symbol is generated for a given time unit and frequency band by a basic sequence (e.g., a random sequence, a set of ZC-based (Zadoff Chu-based) sequences) and every user equipment within a cell uses the same basic sequence. In doing so, SRS transmissions from a plurality of user equipments within a cell on the same frequency band can be orthogonally identified by different cyclic shifts of the basic sequence assigned to a plurality of the user equipments, respectively. Although an SRS sequence of a different cell may be identifiable by assigning a different basic sequence to each cell, orthogonality between the different basic sequences are not guaranteed.

Relay Node

A relay node can be taken into consideration for an expansion of fast data rate coverage, an enhancement of group mobility, a temporary network arrangement, an enhancement of a cell boundary throughput, and/or a network coverage offering to a new area. A relay node may include a fixed relay node located at a fixed place or a mobile relay node having a moving location.

A relay node plays a role in forwarding transmission and reception between a base station and a user equipment. And, two kinds of links (i.e., a backhaul link and an access link) differing from each other in attributes are applied to carrier frequency bands, respectively. The base station may include a donor cell. And, the relay node is connected by wireless to a wireless-access network via the donor cell.

In case that a backhaul link between the base station and the relay node uses a DL frequency band or DL subframe resource, it may be represented as a backhaul downlink. In case that a backhaul link between the base station and the relay node uses a UL frequency band or UL subframe resource, it may be represented as a backhaul uplink. In this case, the frequency band is a resource allocated in FDD (frequency division duplex) mode and the subframe is a resource allocated in TDD (time division duplex) mode. Similarly, in case that an access link between the relay node and the user equipment(s) uses a DL frequency band or DL subframe resource, it may be represented as an access downlink. In case that an access link between the relay node and the user equipment(s) uses a UL frequency band or UL subframe resource, it may be represented as an access uplink.

A UL reception function and a DL transmission function are necessary for a base station and a UL transmission function and a DL reception function are necessary for a user equipment. On the other hand, a function of a backhaul UL transmission to a base station, a function of an access UL reception from a user equipment, a function of a backhaul DL reception from a base station and a function of an access DL transmission to a user equipment are necessary for a relay node.

Figure 9:
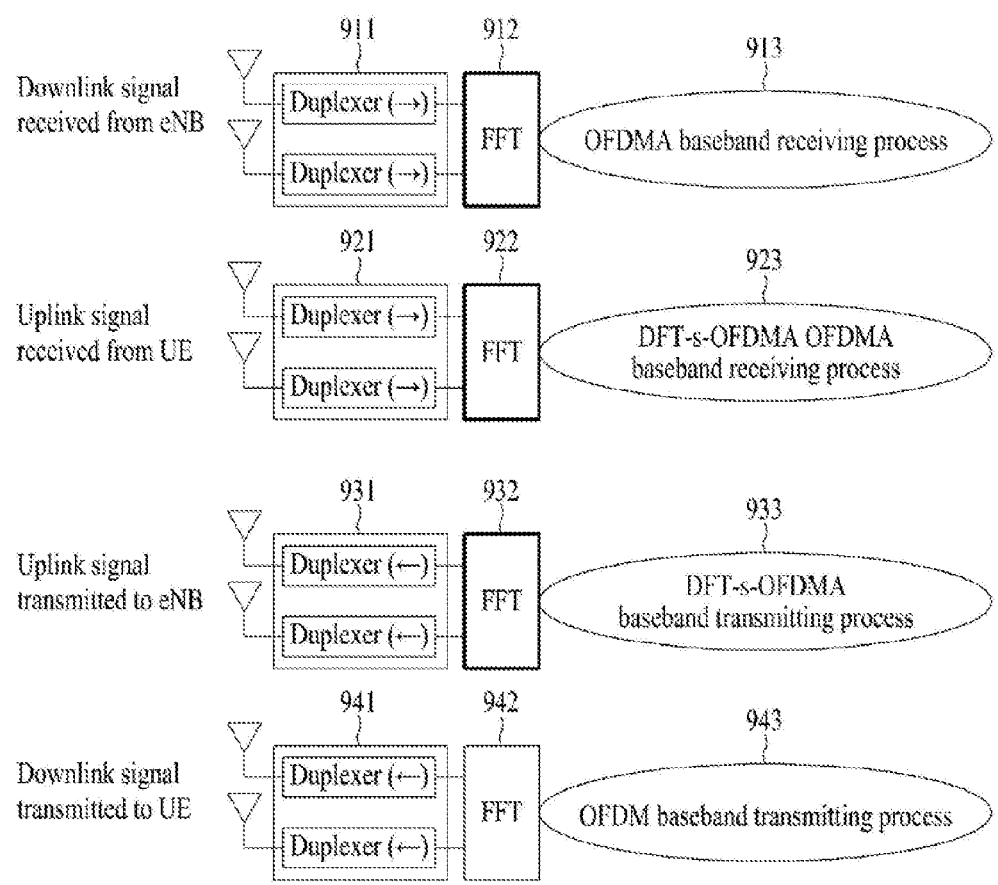
FIG. 9 is a diagram for one example of transceiving unit function implementation of FDD mode relay node.

FIG. 9 is a diagram for one example of transceiving unit function implementation of an FDD mode relay node. A reception function of a relay node is conceptionally explained as follows. First of all, a DL signal received from a base station is forwarded to an FTT (fast Fourier transform) module 912 via a duplexer 911 and an OFDMA baseband reception process 913 is then performed. A UL signal received from a user equipment is forwarded to an FFT module 922 via a duplexer 921 and a DFT-s-OFDMA (discrete Fourier transform-spread-OFDMA) baseband reception process 923 is then performed. The process for receiving a DL signal from a base station and the process for receiving a UL signal from a user equipment may be simultaneously performed in parallel with each other. On the other hand, a transmission function of the relay node is conceptionally explained as follows. First of all, a UL signal transmitted to a base station is transmitted via a DFT-s-OFDMA baseband transmission process 933, an IFFT (inverse FFT) module 932 and a duplexer 931. The process for transmitting the UL signal to the base station and the process for transmitting the DL signal to the user equipment may be simultaneously performed in parallel with each other. And, the duplexers shown in one direction may be implemented into a single bidirectional duplexer. For instance, the duplexer 911 and the duplexer 931 may be implemented into a single bidirectional duplexer. For another instance, the duplexer 921 and the duplexer 941 may be implemented into a single bidirectional duplexer. In particular, the bidirectional duplexer may be implemented in a manner that an IFFT module and baseband process module line associated with transmission/reception on a specific carrier frequency band diverges from a single bidirectional duplexer.

Meanwhile, regarding a use of a band (or spectrum) of a relay node, one case in which a backhaul link operates on the same frequency band of an access link may be referred to as 'in-band', and the other case in which a backhaul link operates on a frequency band different from that of an access link is referred to as 'out-band'. In both of the above-mentioned two cases of the in-band and the out-band, it is necessary for a user equipment (hereinafter named a legacy user equipment) operating in a legacy LTE system (e.g., Release-8) to access a donor cell.

Relay nodes may be classified into a transparent relay node and a non-transparent relay node by depending on whether a user equipment recognizes the relay node. In particular, the 'transparent' may mean a case that a user equipment is unable to recognize whether the user equipment is communicating with a network through a relay node. And, the 'non-transparent' may mean a case that a user equipment is able to recognize whether the user equipment is communicating with a network through a relay node.

Regarding controls of a relay node, relay nodes may be classified into one relay node configured as a part of a donor cell and another relay node capable of controlling a cell by itself.

Although the relay node configured as a part of the donor cell may have a relay node identifier (ID), the relay node does not have a cell identity of its own. If at least one portion of RPM (Radio Resource Management) is controlled by a base station having the donor cell belong thereto (despite that the rest of the RPM is located at the relay node), the above-mentioned relay node may be considered as a relay node (RN) configured as a part of the donor cell. Preferably, this relay node may be able to support a legacy user equipment. For example, smart repeaters, decode-and-forward relays, a variety of L2 (second layer) relay nodes, and a type-2 relay node may belong to the category of the above-mentioned relay node.

Regarding a relay node configured to self-control a cell, this relay node controls one or more cells, a unique physical layer cell identity is provided to each cell controlled by the relay node, and the same RPM mechanism may be usable. In aspect of a user equipment, there is no difference between accessing a cell controlled by a relay node and accessing a cell controlled by a general base station. Preferably, a cell controlled by the above-mentioned relay node may be able to support a legacy user equipment. For example, a self-backhauling RN, an L3 (third layer) relay node, a type-1 relay node, and a type-1 a relay node may belong to the category of the above-mentioned relay node.

The type-1 relay node plays a role as an in-band relay node in controlling a plurality of cells, and a user equipment may consider each of the cells as a separate cell discriminated from a donor cell. Moreover, each of a plurality of the cells has a physical cell ID (defined in LTE Release-8) of its own and the relay node may be able to transmit a synchronization channel of its own, a reference signal and the like. In case of a single-cell operation, a user equipment may directly receive scheduling information and HARQ feedback from a relay node and can transmit a control channel (scheduling request (SR), CQI, ACK/NACK, etc.) of its own to a relay node. Moreover, legacy user equipments (e.g., user equipments operating in LTE Release-8 system) may consider the type-1 relay node as a legacy base station (e.g., a base station operating in the LTE Release-8 system). In particular, the type-1 relay node has backward compatibility. Meanwhile, in aspect of user equipments operating in LTE-A system, the type-1 relay node is considered as a base station different from a legacy base station, whereby performance thereof can be enhanced.

The type-1 a relay node operates in the out-band, and has the same features as those of the type-1 relay node. Operation of the type-1a relay node can be configured to minimize (or eliminate) the influence on L1 (firstfirst layer) operation.

The type-2 relay node corresponds to an in-band relay node but has no separate physical cell ID not to form a new cell. The type-2 relay node is transparent to a legacy user equipment and the legacy user equipment is unable to recognize the presence of the type-2 relay node. Although the type-2 relay node is able to transmit PDSCH, it does not transmit CRS and PDCCH at least.

Meanwhile, in order for a relay node to operate in in-band, prescribed resources in time-frequency space must be reserved for a backhaul link and these resources may be configured not be used for an access link. This configuration is called 'resource partitioning'.

The general principles related to the resource partitioning in a relay node may be described as follows. First of all, a backhaul downlink and an access downlink may be multiplexed together on a single carrier frequency by Time Division Multiplexing (TDM) [i.e., either the backhaul downlink or the access downlink is activated in specific time.). Similarly, a backhaul uplink and an access uplink may be multiplexed together on a single carrier frequency by TDM [i.e., either the backhaul uplink or the access uplink can be activated in specific time).

Regarding the backhaul link multiplexing by FDD, a backhaul downlink transmission is performed on a downlink frequency band, and a backhaul uplink transmission is performed on an uplink frequency band. Regarding the backhaul link multiplexing by TDD, a backhaul downlink transmission is performed in a downlink subframe of a base station or a relay node, and a backhaul uplink transmission is performed in an uplink subframe of the base station or the relay node.

In case of an in-band relay mode, for example, provided that both a backhaul downlink reception from a base station and an access downlink transmission to a user equipment are simultaneously performed on a prescribed frequency band, a signal transmitted from a transmitting end of a relay node may be received by a receiving end of the relay node, whereby signal interference or RF jamming may occur at an RF front-end of the relay node. Similarly, if both an access uplink reception from a user equipment and a backhaul uplink transmission to a base station are simultaneously performed on a prescribed frequency band, signal interference may occur at the RF front-end of the relay node. Therefore, it may be difficult to implement the simultaneous transmission and reception on a single frequency band at a relay node unless a sufficient separation between a received signal and a transmitted signal is provided [e.g., a transmitting antenna and a receiving antenna are installed in a manner of being sufficiently spaced apart from each other (e.g., installed on/under the ground)].

Figure 10:
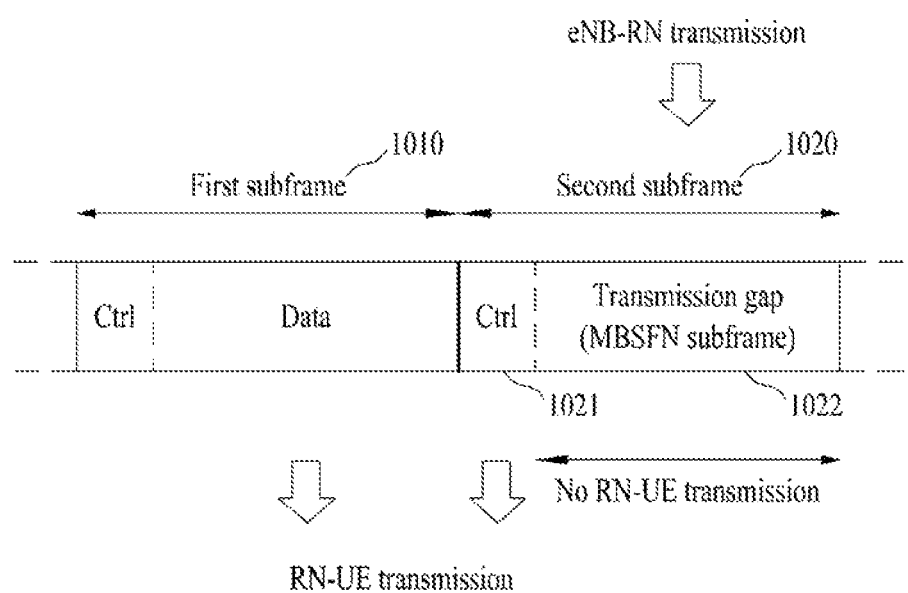
FIG. 10 is a diagram to describe a transmission from a relay node to a user equipment and a downlink transmission from a base station to a user equipment.

As a solution for the above signal interference problem, it may be able to enable a relay node not to transmit a signal to a user equipment while receiving a signal from a donor cell. In particular, a gap is generated in a transmission from the relay node to the user equipment, and the user equipment (e.g., a legacy user equipment, etc.) may be configured not to expect any transmission from the relay node during this gap. The above-mentioned gap may be generated by constructing MBSFN (Multicast Broadcast Single Frequency Network) subframe [cf. FIG. 10]. Referring to FIG. 10, in a first subframe 1010 that is a normal subframe, a downlink (i.e., an access downlink) control signal and data are transmitted from a relay node to a user equipment. In a second subframe 1020 that is an MBSFN subframe, while a control signal is transmitted from the relay node to the user equipment on a control region 1021 of a downlink subframe but any transmission from the relay node to the user equipment is not performed in the rest region 1022 of the downlink subframe. In doing so, since a legacy user equipment expects a transmission of physical downlink control channel (PDCCH) in all downlink subframes (i.e., the relay node needs to support legacy user equipments within a coverage of the relay node to receive PDCCH in each subframe and to perform a measurement function thereof), it is necessary for the PDCCH to be transmitted in all the downlink subframes in order for each legacy user equipment to operate correctly. Therefore, in a subframe (i.e., the second subframe) configured for a downlink (i.e., backhaul downlink) transmission from a base station to a relay node, the relay node needs to perform an access downlink transmission in first N OFDM symbols (N=1, 2 or 3) rather than to receive a backhaul downlink. For this, since PDCCH is transmitted from the relay node to the user equipment in a control region 1021 of the second subframe, it may be able to provide backward compatibility with a legacy user equipment served by the relay node. While no signal is transmitted in the rest region 1022 of the second subframe from the relay node, the relay node may be able to receive a transmission from the base station. Therefore, the above-mentioned resource partitioning scheme can prevent the access downlink transmission and the backhaul downlink reception from being simultaneously performed by the in-band relay node.

The second subframe 1022, which uses the MBSFN subframe, shall be described in detail as follows. First of all, a control region 1021 of the second subframe may be referred to as a relay node non-hearing interval. In particular, the relay node non-hearing interval may mean the interval in which a relay node transmits an access downlink signal instead of receiving a backhaul downlink signal. As mentioned in the foregoing description, this relay node non-hearing interval may be configured to have 1-, 2- or 3-OFDM length. In the relay node non-hearing interval 1021, a relay node performs an access downlink transmission to a user equipment and may receive a backhaul downlink from a base station in the rest region 1022. In doing so, since the relay node is unable to perform both transmission and reception on the same frequency band, it may take a time to enable the relay node to be switched from a transmitting mode to a receiving mode. Hence, it may be necessary to configure a guard time (GT) to enable the relay node to perform a transmitting/receiving mode switching in first partial interval of a backhaul downlink receiving region 1022. Similarly, even if the relay node operates in a manner of receiving a backhaul downlink from the base station and transmitting and access downlink to the user equipment, it may be able to configure a guard time (GT) for the transmitting/receiving mode switching of the relay node. The length of the guard time may be defined as a value in time domain. For example, the length of the GT may be defined as k time samples (Ts) (where, k 1) or may be set to the length of at least one or more OFDM symbols. Alternatively, in case that relay node backhaul downlink subframes are contiguously configured or in accordance with a prescribed subframe timing alignment relation, the guard time of a last part of a subframe may be defined or may not configured. In order to maintain backward compatibility, this guard time may be defined only in a frequency domain configured for a backhaul downlink subframe transmission (i.e., a legacy user equipment is not supportable if a guard time is configured in an access downlink interval). In the backhaul downlink receiving interval 1022 except the guard time, the relay node may be able to receive relay node dedicated PDCCH and PDSCH from the base station. In the meaning of a relay node dedicated physical channel, the PDCCH and the PDSCH may also be represented as R-PDCCH (Relay-PDCCH) and R-PDSCH (Relay-PDSCH), respectively.

Inter-Cell Coordination & Transmission/Reception of Control Channel

In an advanced wireless communication system (e.g., LTE-A system, LTE Release-10 system, etc.), how to apply an enhanced inter-cell interference coordination (eICIC) scheme to a case that an inter-cell interference is greater than a signal of a serving cell in a heterogeneous network is currently discussed. The heterogeneous network may include a macro-pico case and/or a macro-femto case for example. A pico cell is able to exchange information with another cell (e.g., a macro cell) via X2 interface (or backhaul link) but a femto cell does not transceive information with another cell via the X2 interface.

For one example of various eICIC schemes, a method for an interference-giving cell (i.e., an aggressor cell) not to perform a transmission in a specific resource region for a user equipment connected to an interference-given cell (i.e., a victim cell) [i.e., represented as a null signal transmission or a silencing] may be applicable. For example of a silencing operation, an aggressor cell can configure a specific subframe as an MBSFN subframe. In a DL subframe configured as an MBSFN subframe, a signal is transmitted in a control region only but is not transmitted in a data region. For another example of a silencing operation, an aggressor cell may configure a specific subframe as ABS (almost blank subframe) or ABS-with-MBSFN. In this case, the ABS means a subframe having CRS transmitted in control and data regions of a DL subframe only without transmitting control information and data. Yet, in the ABS, a DL channel (e.g., PBCH (physical broadcast channel), etc.) and a DL signal (e.g., PSS (primary synchronization signal), SSS (secondary synchronization signal, etc.) can be transmitted. The ABS-with-MBSFN means a case that CRS of a data region is not transmitted in the above-mentioned ABS.

In this case, the silencing performed specific resource region can be represented as a time resource and/or a frequency resource. For instance, a silenced time resource location may be determined by a combination of at least one of a whole time region, a specific subframe, a specific slot and a specific OFDM symbol unit. For instance, a silenced frequency resource location may be determined by a combination of at least one of a whole frequency band, a specific carrier (in case of carrier aggregation using a plurality of carriers), a specific resource block and a specific subcarrier unit. Therefore, a silencing performed resource region can be clearly specified up to a resource element (RE) unit.

Figure 11:
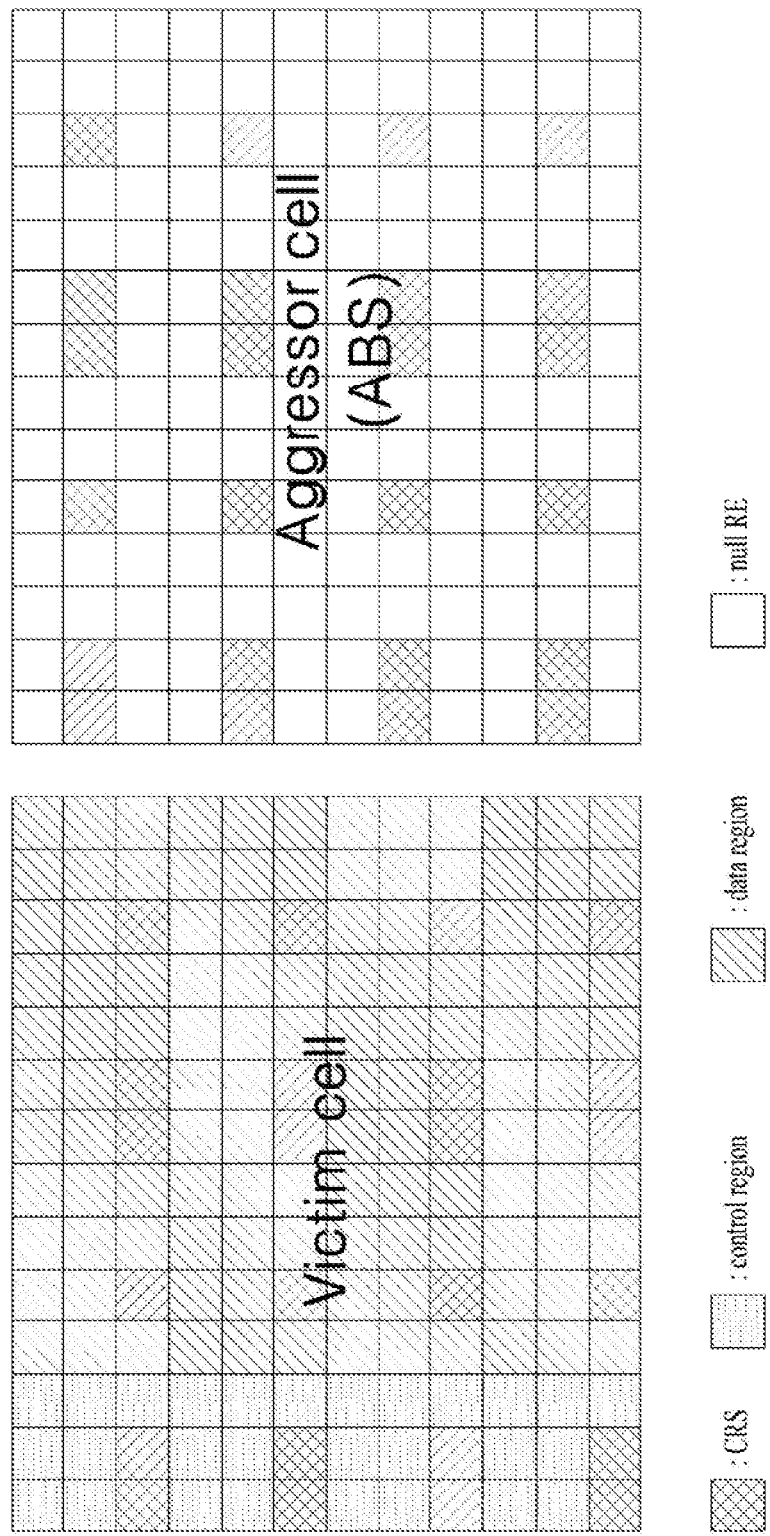
FIG. 11 is a diagram for one example of ABS application.

FIG. 11 is a diagram for one example of ABS application. In the example shown in FIG. 11, assume that inter-cell subframe boundary is identical. In particular, assume that a start timing of a subframe of an aggressor cell and a start timing of a subframe of a victim cell match each other.

In case that ABS is applied as part of eICIC, since all REs except CRS in the resource of an aggressor cell are configured as null REs, as shown in FIG. 11, interference is not caused to a victim cell by the REs except the CRS. Hence, inter-cell interference can be considerably reduced. Moreover, FIG. 11 shows one example that CRS in one cell is shifted [$V_{shift}$] by 1 RE in frequency direction to prevent CRS locations of the aggressor and victim cells from overlapping with each other. If MBSFN can be configured for the aggressor cell, the generation of the interference caused by the CRS of the aggressor cell can be reduced in a data region. Hence, a user equipment of the victim cell considerably affected by the interference from the aggressor cell is able to maintain a communication with a serving cell (i.e., the victim cell) with good performance in a subframe set by the aggressor cell to ABS and/or MBSFN subframe.

Figure 12:
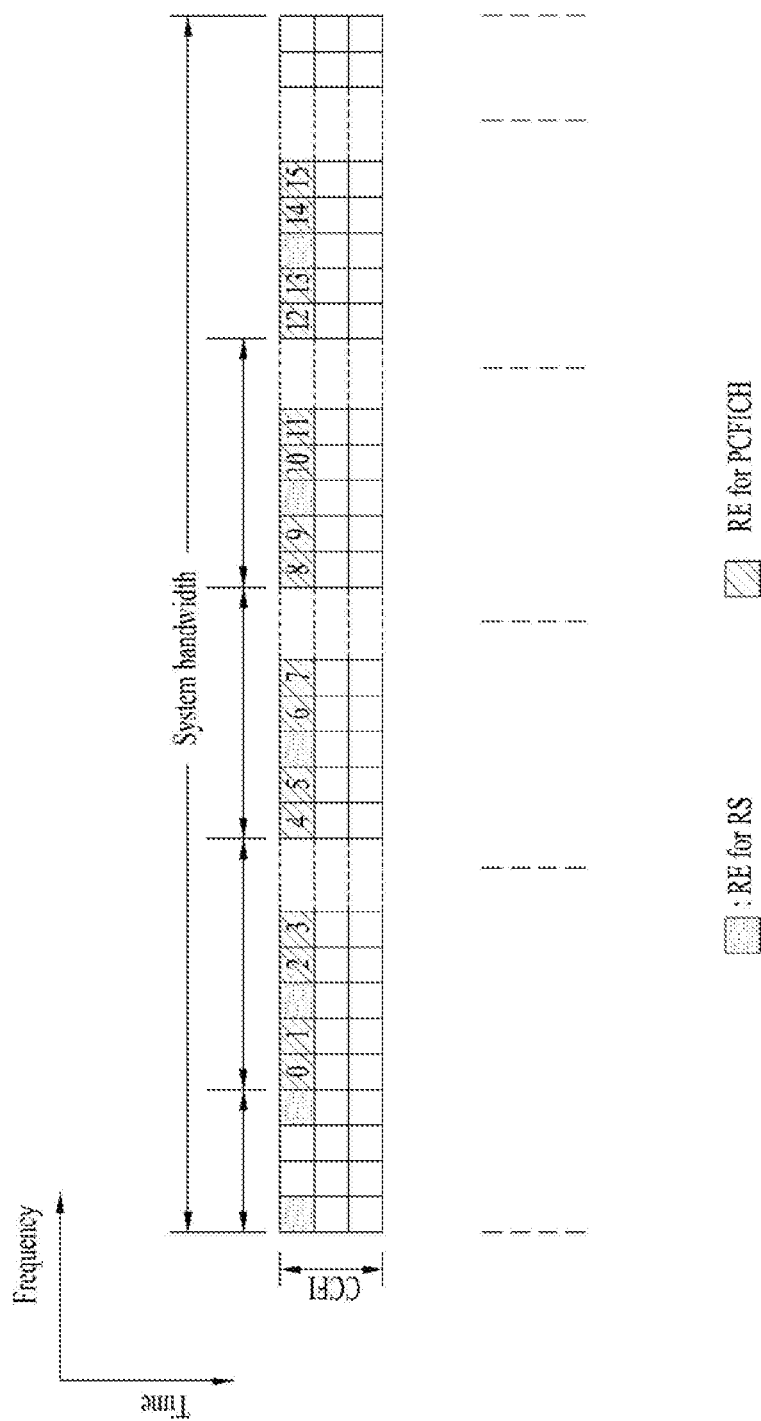
FIG. 12 is a diagram to describe PCFICH mapped resource elements.

Meanwhile, PCFICH mapped resource elements are described with reference to FIG. 12 as follows.

First of all, PCFICH among control channels of LTE or LTE-A system is the channel that carries the information (i.e., control channel format indicator (CCFI)) on the number of OFDM symbols used for a PDCCH transmission in a single subframe. In this case, the number of the PFDM symbols used for the PDCCH transmission may be set to 1, 2, or 3 for example. The PCFICH contains 32-bit information for example, undergoes cell-specific scrambling, QPSK modulation, layer mapping and precoding, and is then mapped to and carried on resource elements (REs). Four contiguous REs among the rest of REs except the RE used by a reference signal (e.g., CRS) in a firstfirst OFDM symbol (i.e., OFDM symbol 0) of a single subframe can be configured into one group (or a quadruplet). In the example shown in FIG. 12, REs denoted by 0, 1, 2 and 3 configure one group and REs denoted by 4, 5, 6 and 7 configure another group. Likewise, REs denoted by 8, 9, 10 and 11 configure one group and REs denoted by 12, 13, 14 and 15 configure another group. The PCFICH can be then mapped to the above-configured 4 groups. A start point (or an offset) of the PCFICH mapped RE location, an interval between the groups and the like can be determined depending on a system bandwidth, the number of REs configuring one RB, a cell identifier and the like. Therefore, the PCFICH can be transmitted at a specific RE location in a firstfirst OFDM symbol (i.e., OFDM symbol 0) of one subframe.

In the example shown in FIG. 11, in case that a subframe of an aggressor cell is configured as ABS, interference with a victim cell is considerably reduced. Yet, interference caused by CRS of the aggressor cell still exists, thereby causing a problem of performance degradation of the victim cell. Particularly, since the PCFICH of the victim cell is transmitted in a first OFDM of the subframe, it is directly affected by the CRS from the aggressor cell.

Figure 13:
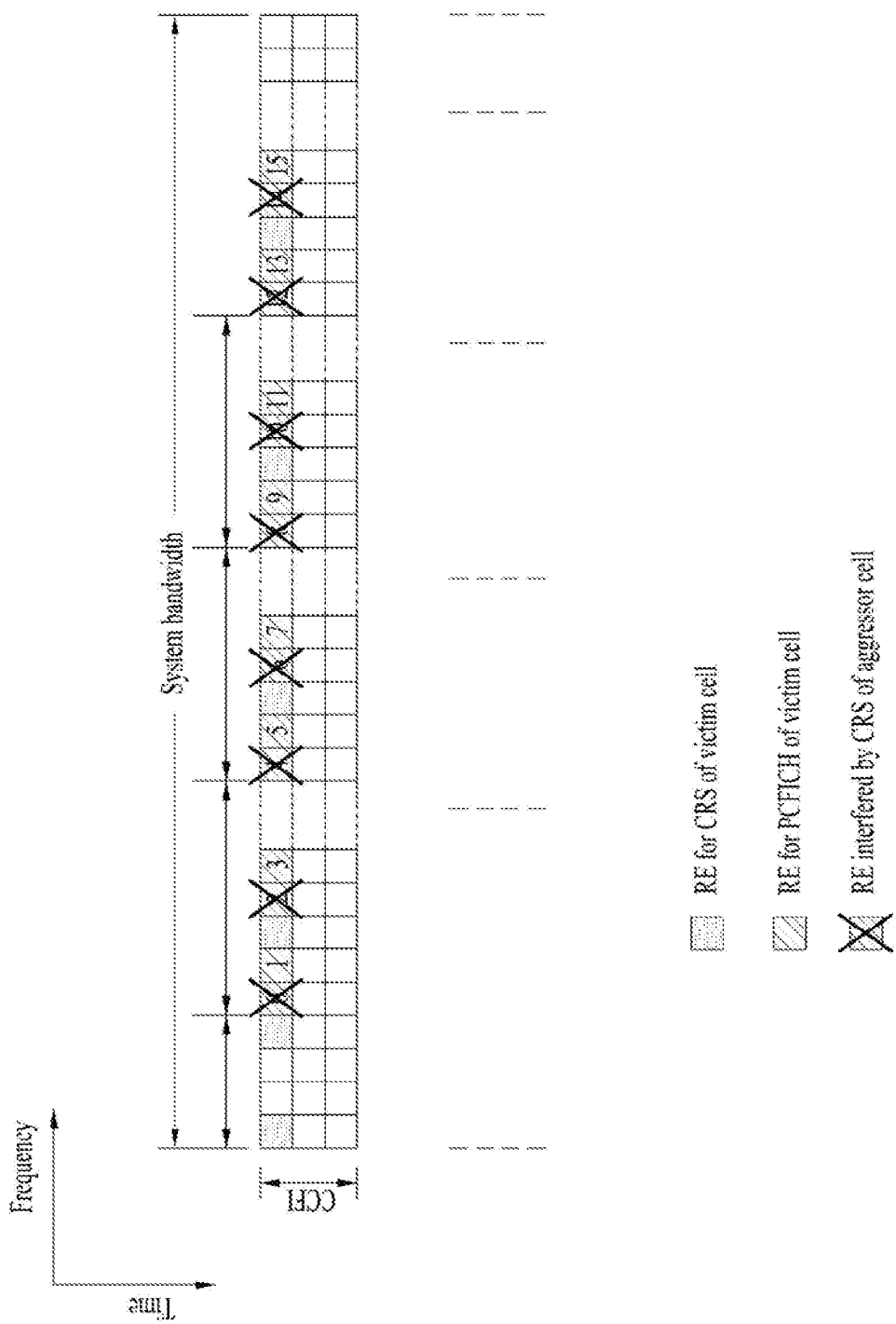
FIG. 13 is a diagram to illustrate interference caused to PCFICH of a victim cell in case of applying eICIC scheme.

FIG. 13 is a diagram to illustrate interference caused to PCFICH of a victim cell in case of applying such an eICIC scheme as shown in FIG. 11. Like the example shown in FIG. 11, if a CRS location of an aggressor cell is shifted by 1 RE on a frequency axis in comparison with a CRS location of a victim cell, interference by the CRS of the aggressor cell is caused to 50% of PCFICH mapped REs on a first OFDM symbol of the victim cell. In particular, referring to FIG. 13, in case that the PCFICH of the victim cell is transmitted on 16 REs, the REs denoted by 0, 2, 4, 6, 8, 10, 12 and 14 among the 16 REs receive the interference caused by the CRS of the aggressor cell, a user equipment of the victim cell may not decode the PCFICH correctly.

If the user equipment is unable to decode the PCFICH correctly, it is not able to be aware of the number of PDCCH transmitted OFCM symbols. Therefore, probability of failure in decoding PDCCH is raised and probability of failure in decoding another control channel and probability of failure in decoding a data channel are then considerably raised as well. Thus, the PCFICH decoding failure is directly connected to the degradation of overall system performance.

In the above-described heterogeneous network environment, in aspect of the victim cell, it may consider improving PCFICH decoding performance of the victim cell by reducing the interference (i.e., CRS transmission power of the aggressor cell) caused by the CRS of the aggressor cell. Yet, in aspect of the aggressor cell, since the CRS needs to be transmitted with a transmission power higher than that of other signals to be receivable by all user equipments in a cell, if the transmission power of the CRS is reduced, it may cause performance degradation of the aggressor cell. Therefore, the eICIC scheme by the transmission power control is unable to solve the problem fundamentally.

The present invention proposes various examples of methods for solving the problem of the PCFICH decoding performance degradation mentioned in the above description.

Embodiment 1

According to the present embodiment, a victim cell can differentiate a method of determining a value of an OFDM symbol used for a transmission of PDCCH depending on whether a DL subframe corresponds to a first type subframe or a second type subframe. In this case, the first type subframe may correspond to a coordinated subframe and the second type subframe may correspond to an uncoordinated subframe.

In a coordinated subframe, a victim cell can use a predefined value N as the number of OFDM symbols used for a PDCCH transmission. In this case, the coordinated subframe may mean the subframe of the victim cell corresponding to a subframe configured as ABS, MBSFN or ABS-with-MBSFN by an aggressor cell. And, the number of the OFDM symbols used for the PDCCH transmission corresponds to a value (e.g., CCFI) transmitted on PCFICH. In particular, the present embodiment proposes that the number of the OFDM symbols used for the PDCCH transmission in the coordinated subframe is provided not via the PCFICH but using the predefined value N. In this case, the predefined value N may include one of 1, 2 and 3 for example. Alternatively, the predefined value N may become 3 that is a maximum value of the number of the OFDM symbols used for the PDCCH transmission.

The victim cell can signal the number of the OFDM symbols used for the PDCCH transmission via the PCFICH, like the existing method, for the user equipments that receive relatively small influence of the interference in the uncoordinated subframe. The user equipments receiving relatively small influence of the interference may include a user equipment located at the center of the victim cell.

In particular, the victim cell uses the predefined value N as the number of the OFDM symbols used for the PDCCH transmission in the coordinated subframe and can signal the number of the OFDM symbols used for the PDCCH transmission via the PCFICH in the uncoordinated subframe.

Figure 14:
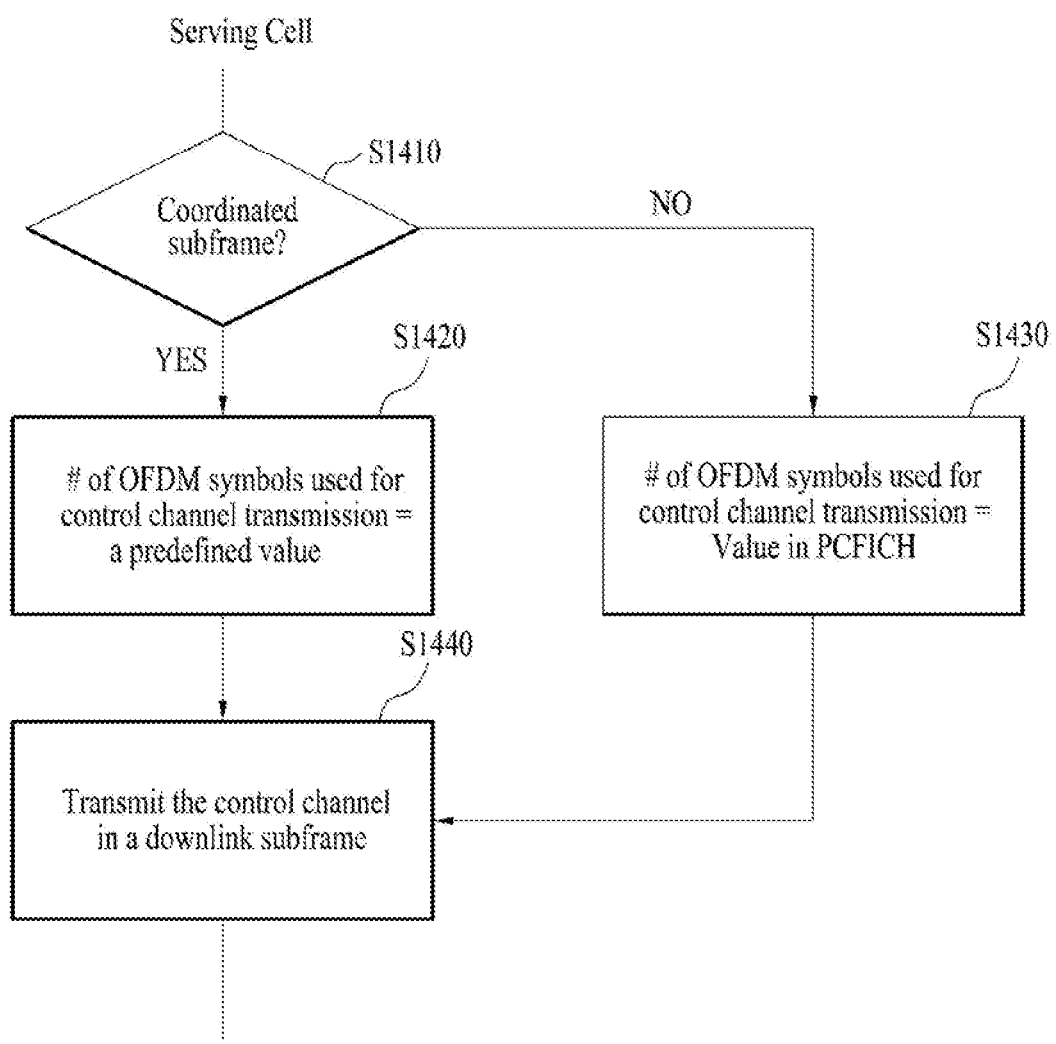
FIG. 14 is a flowchart to describe an operation of a base station according to the present invention.

FIG. 14 is a flowchart to describe an operation of a base station according to the present invention.

Referring to FIG. 14, a serving cell base station can determine whether a prescribed subframe is a coordinated subframe or an uncoordinated subframe [S1410].

If a result of the step S1410 is YES, the number of PDCCH transmission OFDM symbols can be configured as a predefined value N [S1420]. Hence, a PDCCH mapped DL subframe can be transmitted on OFFDM symbols amounting to the number corresponding to the predefined value N [S1440].

On the contrary, if a result of the step S1410 is NO, the number of PDCCH transmission OFDM symbols can be configured as a value to be transmitted on PCFICH [S1430]. Hence, a PDCCH mapped DL subframe can be transmitted on OFFDM symbols amounting to the number transmitted on the PCFICH [S1440].

Embodiment 2

As mentioned in the foregoing description of the embodiment 1, if a serving cell performs an operation of determining the number of PDCCH transmission OFDM symbols in accordance with a predefined value or an operation of providing the number of PDCCH transmission OFDM symbols via PCFICH, a user equipment may not be aware how the serving cell operates.

If the serving cell is able to accurately inform the user equipment that a prescribed subframe is a coordinated subframe or an uncoordinated subframe, the user equipment can be aware that the number of PDCCH transmission OFDM symbols in the coordinated subframe is determined as a predefined value N or that the number of PDCCH transmission OFDM symbols in the uncoordinated subframe needs to be obtained from PCFICH. Therefore, the user equipment can perform a PDCCH decoding operation correctly.

Yet, it may happen that the serving cell is unable to inform the user equipment of a subframe configuration (i.e., whether the prescribed subframe is the coordinated subframe or the uncoordinated subframe) in advance. Despite that the serving cell has informed the user equipment of the subframe configuration in advance, it may also happen that a subframe is configured different from the subframe configuration indicated by the serving cell. In this case, the user equipment may not be able to determine whether to apply the predefined value as the number of PDCCH transmission OFDM symbols or to attempt to obtain the value through decoding of the PCFICH. To solve this problem, the present embodiment proposes a method of determining an operation for PCFICH decoding based on a value measured by a user equipment.

First of all, a user equipment measures and calculates a reception state for a DL transmission from a neighboring cell and is then able to report the measured and calculated reception state. Subsequently, the serving cell can perform such an operation as a handover and the like based on the DL reception state reported by the user equipment. In this case, the measurement result indicating the reception state for the DL transmission may include Reference Signal Received Power (RSRP), Reference Signal Received Quality (RSRQ), Received Signal Strength Indicator (RSSI) and the like. Based on the values (e.g., RSRP) measured by the user equipment, the user equipment can determine an operation for the PCFICH decoding.

In particular, using RSRPs of the serving cell and other cell(s), the user equipment is able to determine whether to apply a predetermined value as the number of PDCCH transmission OFDM symbols or to find out the number of PDCCH transmission OFDM symbols through the PCFICH decoding. In the following description, the other cell(s) shall be named a measured cell.

For instance, the user equipment can measure/calculate RSRP ($RSRP_{ServingCell}$) of the serving cell, RSRP ($RSRP_{MeasuredCell}$) of the measured cell, and a difference value ($Diff_{RSRP}=RSRP_{ServingCell}-RSRP_{MeasuredCell}$) in-between. Moreover, a prescribed reference value ($Threshold_{PCFICH}$) for the RSRP difference value can be defined. Hence, the user equipment can determine the operation for the PCFICH decoding depending on the relation between the $Diff_{RSRP}$ and the $Threshold_{PCFICH}$.

In this case, the $Threshold_{PCFICH}$ can be determined as a reference value determined relative to a previous absolute reference value (e.g., a reference value related to the determination of handover execution). For example, a value higher than the previous absolute reference value by a prescribed size may be named $Threshold_{PCFICH,HIGH}$. And, a value lower than the previous absolute reference value by a prescribed size may be named $Threshold_{PCFICH,LOW}$.

The $Threshold_{PCFICH,HIGH}$ may be used as a reference value for determining an operation for the PCFICH decoding if the user equipment is unable to receive a handover command from the serving cell despite a situation in which a signal from the serving cell is stronger than that of the other cell (i.e., the measured cell). For instance, if $Diff_{RSRP}>Threshold_{PCFICH,HIGH}$, the user equipment attempts to obtain the number of PDCCH transmission OFDM symbols through the PCFICH decoding. If $Diff_{RSRP} \leq Threshold_{PCFICH,HIGH}$, the user equipment may operate to apply a predetermined value to the number of PDCCH transmission OFDM symbols.

The $Threshold_{PCFICH,LOW}$ may be used as a reference value for determining an operation for the PCFICH decoding if the user equipment receives a handover command from the serving cell despite a situation in which a signal from the serving cell is stronger than that of the other cell (i.e., the measured cell). For instance, if $Diff_{RSRP}>Threshold_{PCFICH,LOW}$, the user equipment attempts to obtain the number of PDCCH transmission OFDM symbols through the PCFICH decoding. If $Diff_{RSRP} \leq Threshold_{PCFICH,LOW}$, the user equipment may operate to apply a predetermined value to the number of PDCCH transmission OFDM symbols.

In addition, the $Threshold_{PCFICH}$ may be determined based on PCFICH performance. In particular, the $Threshold_{PCFICH}$ can be determined to correspond to a minimum SINR (Signal-to-Interference plus Noise Ratio) at which the PCFICH can be correctly decoded. In more particular, an RSRP difference value, which does not meet the decoding condition of the PCFICH because the RSRP of the interference-giving cell is greater than the RSRP of the interference-given cell, can be determined as the $Threshold_{PCFICH}$.

Figure 15:
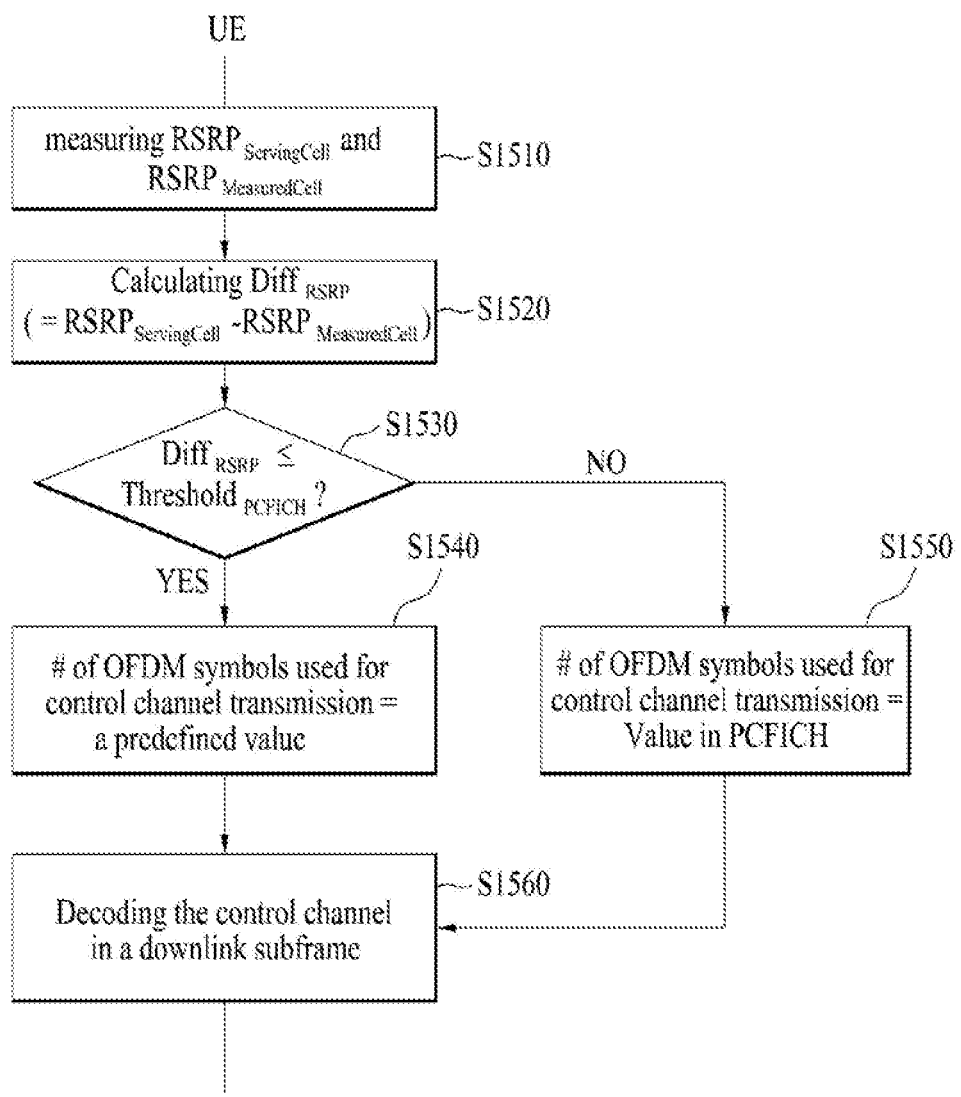
FIG. 15 is a flowchart to describe an operation of a user equipment according to the present invention.

FIG. 15 is a flowchart to describe an operation of a user equipment according to the present invention.

Referring to FIG. 15, a user equipment measures RSRP ($RSRP_{ServingCell}$) of a serving cell and RSRP ($RSRP_{MeasuredCell}$) of a neighboring cell [S1510] and is then able to calculate a difference value $Diff_{RSRP}$ ($=RSRP_{ServingCell}-RSRP_{MeasuredCell}$) in-between [S1520].

The user equipment compares a predetermined reference value $Threshold_{PCFICH}$) to the $Diff_{RSRP}$ calculated in the step S1520, thereby determining whether it is $Diff_{RSRP} \leq Threshold P_{PCFICH}$ [S1530]. If a value of the $Diff_{RSRP}$ gets higher, it corresponds to a case that interference with the neighboring cell becomes smaller. If the value of the $Diff_{RSRP}$ gets lower (e.g., a negative number included), it corresponds to a case that the interference with the neighboring cell becomes bigger. Hence, if $Diff_{RSRP}>Threshold_{PCFICH}$, the interference with the neighboring cell may correspond to a level not enough to degrade the PCFICH decoding performance. If $Diff_{RSRP} \leq Threshold_{PCFICH}$, the interference with the neighboring cell may correspond to a level enough to degrade the PCFICH decoding performance.

If the result of the step S1530 is YES, it may correspond to a case that the interference with the neighboring cell is higher than the reference. In this case, the user equipment can assume that PDCCH is mapped to the number of OFDM symbols amounting to a predefined number N [S1540]. Subsequently, the user equipment can perform the PDCCH decoding based on the assumption of the step S1540 [S1560].

If the result of the step S1530 is NO, it may correspond to a case that the interference with the neighboring cell is lower than the reference. In this case, the user equipment can obtain the number of PDCCH transmission OFDM symbols from PCFICH [S1550]. Subsequently, the user equipment can perform the PDCCH decoding based on the number of PDCCH transmission OFDM symbols obtained in the step S1550 [S1560].

Embodiment 3

Figure 16:
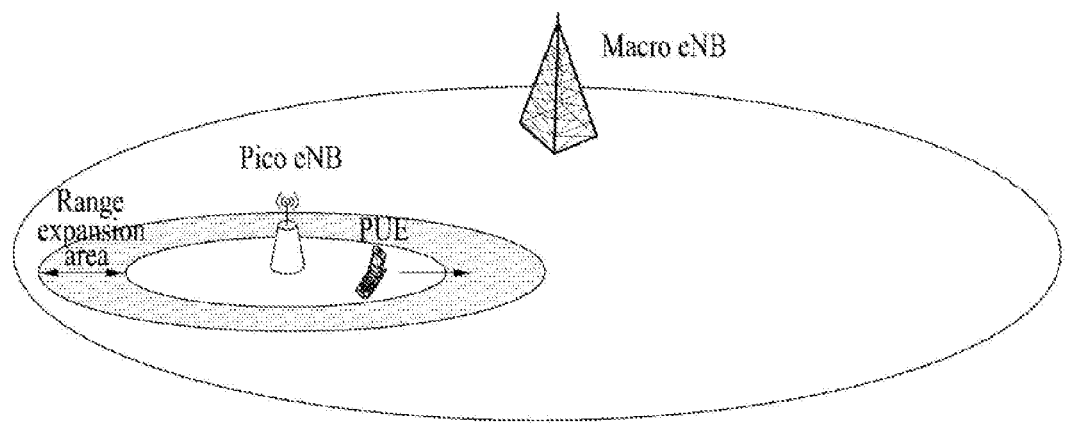
FIG. 16 is a diagram to describe one embodiment of the present invention in a heterogeneous network between a macro cell and a pico cell.

FIG. 16 is a diagram to describe one embodiment of the present invention in a heterogeneous network between a macro cell and a pico cell. In particular, FIG. 16 shows a case that cell range expansion (CRE) is applied in a pico cell. In this case, the CRE is a scheme of increasing overall system throughput by reducing a load put on a macro cell by forcing a range of the pico cell to expand. In this case, a method for a user equipment (PUE), which is served by the pico cell, to avoid/reduce interference from a macro cell is required.

In the example shown in FIG. 16, the PUE is moving away into a range expansion area from a center location of the pico cell. Thus, while the PUE is moving, RSRP of a serving cell (i.e., the pico cell) gradually decreases but RSRP of a neighboring cell (i.e., the macro cell) gradually increases. Hence, $Diff_{RSRP}$ ($=RSRP_{ServingCell}-RSRP_{MeasuredCell}$) gradually decreases. In this case, it becomes highly probable that the user equipment is unable to correctly decode PCFICH from the pico cell due to the strong interference (particularly, interference caused by CRS of the macro cell) from the macro cell. In this case, $Threshold_{PCFICH,HIGH}$ may be determined as a prescribed reference value to determine whether the user equipment uses a predefined value N as the number of PDCCH transmission OFDM symbols or obtains a value through the PCFICH. And, the $Threshold_{PCFICH,HIGH}$ can be determined as the value higher than an RSRP reference value for a handover.

As a user equipment gets away from a center of a pico cell, PCFICH decoding performance is lowered. Yet, according to the present invention, it is able to solve a problem that the user equipment is unable to correctly decode PCFICH as well as to make a handover into a macro cell due to failing in receiving a signaled handover message. In particular, if it is $\text{Diff}_{RSRP} \leq \text{Threshold}_{PCFICH,HIGH}$ and the handover message is not signaled, the user equipment assumes that the number of PDCCH transmission OFDM symbols is a predefined value N and is then able to perform PDCCH decoding correspondingly. Alternatively, when an absolute value ($|\text{Diff}_{RSRP}|$) of the $\text{Diff}_{RSRP}$ increases gradually and then becomes equal to or greater than an absolute value ($|\text{Threshold}_{PCFICH,HIGH}|$) of the $\text{Threshold}_{PCFICH,HIGH}$, if the handover message is not signaled, the user equipment assumes that the number of PDCCH transmission OFDM symbols is a predefined value N and is then able to operate to perform PDCCH decoding correspondingly. In this case, when the operation of the user equipment is determined by the comparison between $|\text{Diff}_{RSRP}|$ and $|\text{Threshold}_{PCFICH,HIGH}|$, it may exclude a case that the user equipment is facilitated to perform decoding of the PCFICH from the serving cell because $\text{RSRP}_{ServingCell}$ is greater than $\text{RSRP}_{MeasuredCell}$.

For instance, in case that the CRE is not applied, when the user equipment gets out of a range of the pico cell and then enters a range of the macro cell, the handover message should be signaled from the serving cell (i.e., the pico cell). Yet, as the CRE is applied, a power of the signal from the pico cell is weakened and interference with the macro cell is considerably strong. In doing so, if the handover message is not signaled from the serving cell (i.e., the pico cell), the proposal of the present invention mentioned in the foregoing description can be advantageously applied.

Moreover, although the above-described example limitedly relates to the case that the handover message is not received, the user equipment can determine whether to perform the PCFICH decoding operation irrespective of a presence or non-presence of the handover message signaling if the PCFICH decoding performance is lowered. For instance, if a calculation result of $\text{Diff}_{RSRP}$ is determined enough for $\text{RSRP}_{MeasuredCell}$ to affect the PCFICH decoding performance (this can be determined by the comparison between $\text{Diff}_{RSRP}$ and $\text{Threshold}_{PCFICH,HIGH}$ or a comparison between $\text{Diff}_{RSRP}$ and $\text{Threshold}_{PCFICH}$), the user equipment can perform the PDCCH decoding by assuming that the number of PDCCH transmission OFDM symbols is a predefined value N (i.e., without the PCFICH decoding operation). For instance, if it is $\text{Diff}_{RSRP}$ $\text{Threshold}_{PCFICH,HIGH}$, the user equipment reports the $\text{RSRP}_{MeasuredCell}$ to the serving cell (i.e., the pico cell), receives acknowledgement (i.e., ACK message) from the serving cell, and is then able to directly perform the PDCCH decoding by assuming that the number of PDCCH transmission OFDM symbols is the predefined value N (i.e., without the PCFICH decoding operation).

Embodiment 4

Figure 17:
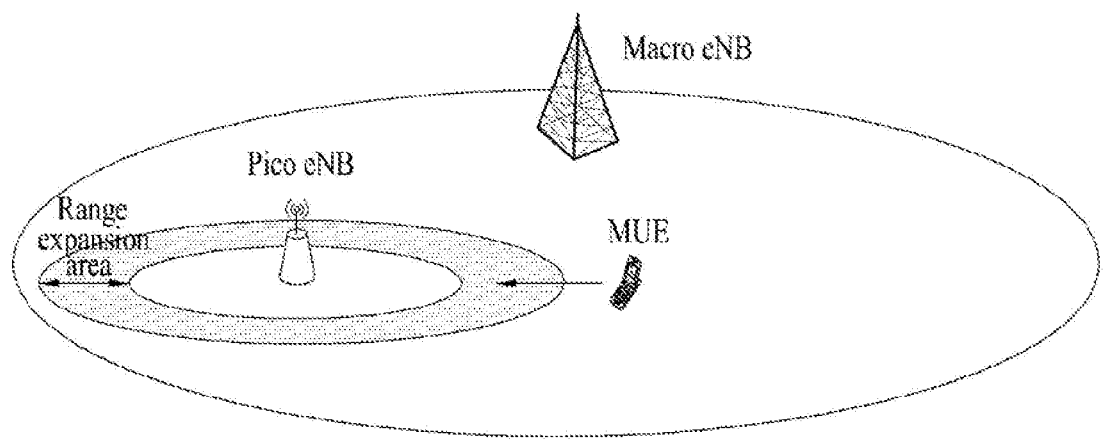
FIG. 17 is a diagram to describe another embodiment of the present invention in a heterogeneous network between a macro cell and a pico cell.

FIG. 17 is a diagram to describe another embodiment of the present invention in a heterogeneous network between a macro cell and a pico cell. In particular, FIG. 16 shows a case that cell range expansion (CRE) is applied in a pico cell.

One example of applying the present invention to a case that a user equipment (MUE) served by a macro cell moves into a range expansion area of a pico cell from a center of the macro cell is described with reference to FIG. 17 as follows.

Thus, while the MUE is moving, RSRP of a serving cell (i.e., the macro cell) gradually decreases but RSRP of a neighboring cell (i.e., the pico cell) gradually increases. Hence, $\text{Diff}_{RSRP}$ ($=\text{RSRP}_{ServingCell} - \text{RSRP}_{MeasuredCell}$) gradually decreases. In this case, it becomes highly probable that the user equipment is unable to correctly decode PCFICH from the macro cell due to the strong interference (particularly, interference caused by CRS of the pico cell) from the pico cell. In this case, $\text{Threshold}_{PCFICH,LOW}$ may be determined as a prescribed reference value to determine whether the user equipment uses a predefined value N as the number of PDCCH transmission OFDM symbols or obtains a value through the PCFICH. And, the $\text{Threshold}_{PCFICH,LOW}$ can be determined as the value lower than an RSRP value for a handover.

According to the present invention, as the user equipment gets away from the center of the macro cell and then enters the range expansion area of the pico cell, it may happen that the user equipment receives a singling of a message indicating a handover from the macro cell into the pico cell despite that the RSRP from the macro cell is still higher than the RSRP from the pico cell. In this case, before the user equipment makes the handover, if it is $\text{Diff}_{RSRP} \leq \text{Threshold}_{PCFICH,LOW}$ and the handover message is signaled, the user equipment assumes that the number of PDCCH transmission OFDM symbols is a predefined value N and is then able to perform PDCCH decoding correspondingly. Alternatively, when an absolute value ($|\text{Diff}_{RSRP}|$) of the $\text{Diff}_{RSRP}$ increases gradually and then becomes equal to or smaller than an absolute value ($|\text{Threshold}_{PCFICH,LOW}|$) of the $\text{Threshold}_{PCFICH,HIGH}$, if the handover message is signaled, the user equipment assumes that the number of PDCCH transmission OFDM symbols is a predefined value N and is then able to operate to perform PDCCH decoding correspondingly. In particular, the user equipment is able to determine the number of PDCCH transmission OFDM symbols without decoding the PCFICH.

For instance, in case that the CRE is not applied, when the user equipment gets out of a range of the macro cell and then enters a range of the pico cell, the handover message should be signaled from the serving cell (i.e., the macro cell). Yet, as the CRE is applied, although a power of the signal from the macro cell is still strong and interference with the pico cell is not strong, if the handover message is signaled from the serving cell (i.e., the macro cell), the proposal of the present invention mentioned in the foregoing description can be advantageously applied.

Moreover, although the above-described example limitedly relates to the case that the handover message is received, the user equipment can determine whether to perform the PCFICH decoding operation irrespective of a presence or non-presence of the handover message signaling if the PCFICH decoding performance is lowered. For instance, if a calculation result of $\text{Diff}_{RSRP}$ is determined enough for $\text{RSRP}_{MeasuredCell}$ to affect the PCFICH decoding performance (this can be determined by the comparison between $\text{Diff}_{RSRP}$ and $\text{Threshold}_{PCFICH,LOW}$ or a comparison between $\text{Diff}_{RSRP}$ and $\text{Threshold}_{PCFICH}$), the user equipment can perform the PDCCH decoding by assuming that the number of PDCCH transmission OFDM symbols is a predefined value N (i.e., without the PCFICH decoding operation). For instance, if it is $\text{Diff}_{RSRP} \leq \text{Threshold}_{PCFICH,LOW}$, the user equipment reports the $\text{RSRP}_{MeasuredCell}$ to the serving cell (i.e., the macro cell), receives acknowledgement (i.e., ACK message) from the serving cell, and is then able to directly perform the PDCCH decoding by assuming that the number of PDCCH transmission OFDM symbols is the predefined value N (i.e., without the PCFICH decoding operation).

Moreover, after a user equipment has made a handover, a serving cell becomes a pico cell and a neighboring cell becomes a macro cell. In doing so, in case that the user equipment is located in a range expansion area of the pico cell, the present invention can be applied. In this case, if $DIFF_{RSRP}$ measured by the user equipment is enough to affect PCFICH decoding performance due to strong interference with the macro cell (i.e., $Diff_{RSRP} \leq Threshold_{PCFICH}$), the user equipment is able to perform the PDCCH decoding by assuming that the number of PDCCH transmission OFDM symbols is the predefined value N without the PCFICH decoding operation.

Embodiment 5

Figure 18:
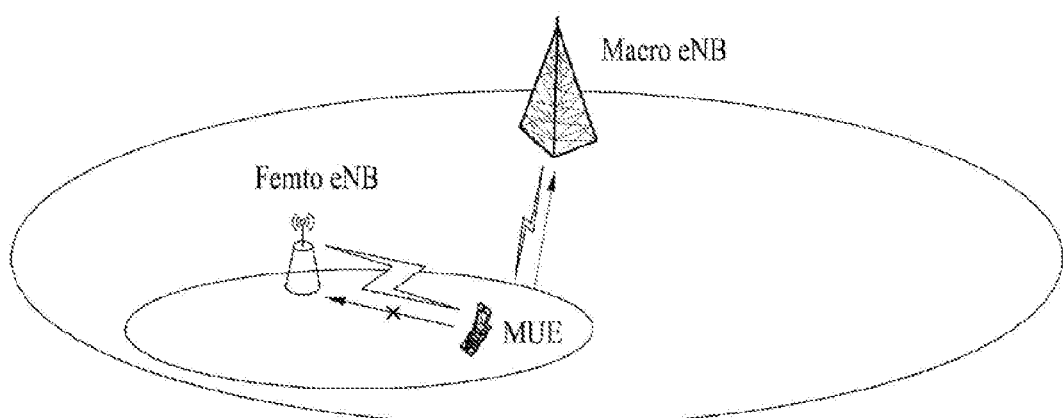
FIG. 18 is a diagram to describe one embodiment of the present invention in a heterogeneous network between a macro cell and a femto cell.

FIG. 18 is a diagram to describe one embodiment of the present invention in a heterogeneous network between a macro cell and a femto cell. In FIG. 18, assume that the femto cell is a cell of a CSG (closed subscriber group) type. And, assume a case that a user equipment (UE) having no authority in using a femto cell is not able to access the corresponding femto cell. Such a femto cell may include a home base station (Home eNB (HeNB)). And, this femto cell does not exchange information with a macro cell via X2 interface.

In the example shown in FIG. 18, assume that an MUE includes a user equipment having no authority in using a femto cell. And, assume that the MUE is served by a macro cell. In case that the MUE is located within an area of the femto cell, the MUE receives strong interference from the femto cell. And, the femto cell may perform an eICIC operation of configuring at least one of DL subframes as ABS and/or MBSFN. In this case, the principle of the present invention may be applicable as a method for the MUE located within the area of the femto cell to determine whether to decode PCFICH from the macro base station (macro eNB).

In particular, since the user equipment does not have the authority in using the femto cell having a high signal power, the user equipment is not able to access the femto cell but has to access the macro cell having a low signal power. In doing so, if a value $Diff_{RSRP}$ ($=RSRP_{ServingCell} - RSRP_{MeasuredCell}$) resulting from subtracting RSRP ($RSRP_{MeasuredCell}$) of the femto cell from RSRP ($RSRP_{ServingCell}$) of the macro cell is equal to or smaller than a prescribed reference value ($Threshold_{PCFICH}$), the user equipment assumes that the number of PDCCH transmission OFDM symbols from a serving cell (i.e., the macro cell) is a predefined value N and is then able to perform PDCCH decoding correspondingly. Alternatively, if an absolute value ($|Diff_{RSRP}|$) of the $Diff_R$ becomes equal to or greater than an absolute value ($|Threshold_{PCFICH,LOW}|$) of the $Threshold_{PCFICH,LOW}$, the user equipment assumes that the number of PDCCH transmission OFDM symbols is a predefined value N and is then able to operate to perform PDCCH decoding correspondingly. In particular, the user equipment can determine the number of PDCCH transmission OFDM symbols without decoding the PCFICH.

In this case, the $Threshold_{PCFICH}$ may be determined as a value corresponding to a minimum SINR for decoding the PCFICH correctly. In particular, a minimum value of the RSRP difference value, which does not meet the decoding condition of the PCFICH because the RSRP of an interference-giving cell is greater than that of an interference-given cell, can be determined as the $Threshold_{PCFICH}$.

Embodiment 6

The present embodiment relates to an example of applying the present invention to a case that the user equipment in the example shown in FIG. 18 performs an initial access process.

In FIG. 18, it is able to assume a case that the user equipment unauthorized in accessing the femto cell attempts an initial access within the area of the femto cell. In this case, the user equipment performs a random access process to access the macro cell. In order to perform the random access process, the user equipment can obtain information required for RACH transmission, system information and the like by decoding a system information block (SIB) transmitted from the macro base station prior to the RACH (random access channel) transmission. The user equipment starts the RACH transmission to the macro base station using the information obtained from decoding the SIB and the macro base station can transmit a response message (RACH response) to the user equipment in response to the RACH transmitted by the user equipment. The SIB and the RACH response are transmitted on PDSCH to the user equipment. Moreover, locations of the SIB and the RACH response within the PDSCH can be obtained by decoding a control channel (e.g., PCFICH, PDCCH, etc.) only.

In doing so, since the user equipment located within the area of the femto cell is receiving strong interference from the femto cell, it is unlikely to happen that the user equipment decodes the PCFICH from the macro base station. If the user equipment fails in decoding the PCFICH, the probability for the user equipment to receive the SIB and the RACH response on the PDSCH in a manner of obtaining the number of PDCCH transmission OFDM symbols and then decoding the PDCCH based on the obtained number of PDCCH transmission OFDM symbols is considerably lowered. To solve this problem, it is able to apply the principle of the present invention thereto.

In the aforementioned initial access process performed by the user equipment, the user equipment can measure RSRPs of neighboring cells. In accordance with a result of the measurement, it may happen that a signal quality of a cell the user equipment intends to access receives a strong interference with a signal of the neighboring cell(s). For instance, if the user equipment does not belong to the CSG of the femto cell, the user equipment is unable to access the femto cell despite that the RSRP from the femto cell is strong. Hence, a case that the user equipment attempts to access a different cell (e.g., macro cell) may correspond to this situation. In this case, if a difference between the RSRP of the cell (macro cell) the user equipment attempts to access and the RSRP of the interference-causing cell (femto cell) is greater than a prescribed reference value (e.g., $Threshold_{PCFICH}$), the user equipment assumes that the number of PDCCH transmission OFDM symbols is a predefined value N and is then able to attempt the PDCCH decoding without decoding the PCFICH. In doing so, the macro cell can perform a PDCCH transmission using OFDM symbols amounting the same number of the predefined value N. Alternatively, in case that the SIB or the RACH response is transmitted from the macro cell, the number of PDCCH transmission OFDM symbols may be set equal to the predefined value N.

Accordingly, the user equipment finds out location information of the SIB by decoding the PDCCH and is then able to decode the corresponding SIB. Subsequently, the user equipment can transmit RACH to the macro cell using the information obtained from the SIB. In case that the user equipment receives the RACH response from the macro cell, the user equipment finds out a location of the RACH response by decoding the PDCCH without decoding the PCFICH and is then able to correctly decode the RACH response.

As mentioned in the foregoing descriptions of various embodiments of the present invention, a method for a user equipment to determine the number of PDCCH transmission OFDM symbols can be advantageously applied to a case of performing inter-cell interference coordination, an initial access operation of a user equipment and the like.

In particular, according to the present invention, in a PDCCH receiving operation of a user equipment, a received signal power of a first cell (e.g., a serving cell, a victim cell, a cell to be initially accessed by a user equipment, etc.) and a received signal power of a second cell (e.g., a neighboring cell, an aggressor cell, a cell causing interference to a user equipment except a cell to be initially accessed by a user equipment, etc.) are measured by the user equipment and a difference value between the measured received signal powers of the respective cells can be compared and determined. Depending on a result of the determination, the user equipment can determine whether to perform PDCCH decoding on the assumption that the number of PDCCH transmission OFDM symbols is a predefined value N or to perform PDCCH decoding by obtaining the number of PDCCH transmission OFDM symbols in a manner of attempting PCFICH decoding.

The contents and/or items explained in the descriptions of the various embodiments of the present invention may be independently applicable or at least two embodiments of the present invention may be simultaneously applicable. And, redundant descriptions shall be omitted from the following description for clarity.

Although the operations in the base station (cell) and the user equipment are exemplarily described for clarity in the aforementioned various embodiments of the present invention, the description of the operation in the base station (cell) is identically applicable to an operation in a relay node device as a downlink transmitting entity or a n uplink receiving entity and the description of the operation in the user equipment is identically applicable to a relay node device as an uplink transmitting entity or a downlink receiving entity.

Figure 19:
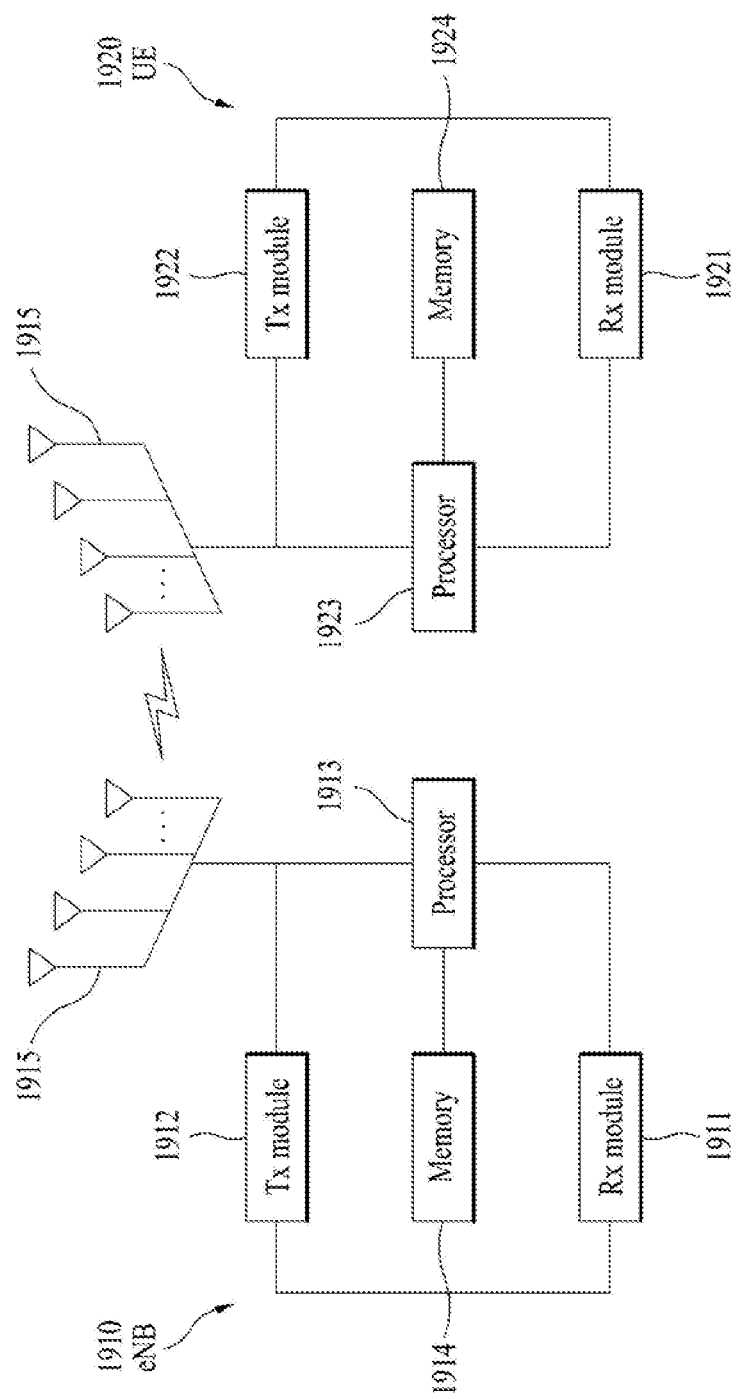
FIG. 19 is a diagram for configurations of a base station device 1910 and a user equipment device 1920 according to one preferred embodiment of the present invention.

FIG. 19 is a diagram for configurations of a base station device 1910 and a user equipment device 1920 according to one preferred embodiment of the present invention.

Referring to FIG. 19, a base station device 1910 according to one embodiment of the present invention may include a receiving module 1911, a transmitting module 1912, a processor 1913, a memory 1914 and a plurality of antennas 1915. A plurality of the antennas 1915 may mean a base station device supportive of MIMO transmission and reception. The receiving module 1911 can receive various signals, data and information in uplink from a user equipment. The transmitting module 1912 can transmit various signals, data and information in downlink to the user equipment. And, the processor 1913 can control overall operations of the base station device 1910.

The base station device 1910 according to one embodiment of the present invention can be configured to transmit a DL control channel. The processor 1913 of the base station device 1910 can be configured to determine whether a DL subframe corresponds to a first type subframe or a second type subframe. The processor 1913 sets the number of OFDM symbols used for a transmission of the DL control channel (e.g., PDCCH) to a predefined number N if the DL subframe is the first type subframe. And, the processor 193 can be configured to transmit the DL control channel on the OFDM symbols amounting to the number equal to the N via the transmitting module 1912. If the DL subframe is the second type subframe, the processor 1913 transmits information on the number of OFDM symbols used for a transmission of the DL control channel via PCFICH and can be configured to transmit the DL control channel on the OFDM symbols amounting to the same number indicated by the information transmitted on the PCFICH.

The first type subframe may include a subframe on which inter-cell interference coordination is performed by a neighboring cell. And, the second type subframe may correspond to a subframe on which the inter-cell interference coordination is not performed by the neighboring cell. Moreover, the inter-cell interference coordination performed subframe may correspond to a subframe configured as ABS, MBSFN subframe or ABS-with-MBSFN subframe by the neighboring cell.

In this case, in the DL subframe corresponding to the first type subframe, the information on the number of the OFDM symbols used for the transmission of the DL control channel may not be transmitted. In particular, the base station may not provide the number of PDCCH transmission OFDM symbols via the PCFICH.

The processor 1913 of the base station device 1910 performs functions of operating and processing information received by the base station device 1910, information to be transmitted by the base station device 1910 and the like. The memory 1914 can store the operated and processed information and the like for a prescribed period and can be substituted with such a component as a buffer (not shown in the drawing) and the like.

Referring to FIG. 19, a user equipment device 1920 according to one embodiment of the present invention may include a receiving module 1921, a transmitting module 1922, a processor 1923, a memory 1924 and a plurality of antennas 1925. A plurality of the antennas 1925 may mean a user equipment device supportive of MIMO transmission and reception. The receiving module 1921 can receive various signals, data and information in downlink from a base station. The transmitting module 1922 can transmit various signals, data and information in uplink to the base station. And, the processor 1923 can control overall operations of the user equipment device 1920.

The user equipment device 1920 according to one embodiment of the present invention can be configured to receive a DL control signal. The processor 1923 of the user equipment device 1920 can be configured to measure a power of a signal transmitted each of a serving cell and a neighboring cell. The processor 1923 can be configured to calculate a difference value ($\text{Diff}_{RSRP}=\text{RSRP}_{ServingCell}-\text{RSRP}_{MeasuredCell}$) resulting from subtracting a power ($\text{RSRP}_{MeasuredCell}$) of a signal received from the neighboring cell from a power ($\text{RSRP}_{ServingCell}$) of a signal received from the serving cell. The processor 1923 may be configured to compare the difference value ($\text{Diff}_{RSRP}$) to a prescribed reference value ($\text{Threshold}_{PCFICH}$). If the difference value ($\text{Diff}_{RSRP}$) is equal to or smaller than the prescribed reference value ($\text{Threshold}_{PCFICH}$), the processor 1923 assumes that the number of OFDM symbols used for a transmission of a DL control channel (e.g., PDCCH) from the serving cell as a predefined value N and decode the DL control channel on the OFDM symbols amounting to a number equal to the N. if the difference value ($\text{Diff}_{RSRP}$) is greater than the prescribed reference value ($\text{Threshold}_{PCFICH}$), the processor 1923 obtains the number of the OFDM symbols used for the transmission of the DL channel by decoding the PCFICH from the serving cell and is then able to decode the DL control channel on the OFDM symbols amounting to the number equal to the information obtained from the PCFICH.

In this case, the prescribed reference value ($\text{Threshold}_{PCFICH}$) can be determined based on an SINR value that meets a decoding condition of the PCFICH from the serving cell. Alternatively, the prescribed reference value (Threshold$_{PCFICH}$) can be determined based on a reception power difference for determining whether to operate a handover. For instance, the prescribed reference value may be set to a value (Threshold$_{PCFICH,HIGH}$) higher than the reception power difference value for the determining whether to operate the handover into the neighboring cell from the serving cell in a range expansion area of the serving cell or a value (Threshold$_{PCFICH,LOW}$) lower than the reception power difference value for determining whether to operate the handover into the neighboring cell from the serving cell in a rage expansion area of the neighboring cell.

And, the result of the measurement of the power of the signal received from each of the serving cell and the neighboring cell can be reported to the base station.

The processor 1923 of the user equipment device 1920 performs functions of operating and processing information received by the user equipment device 1920, information to be transmitted by the user equipment device 1920 and the like. The memory 1924 can store the operated and processed information and the like for a prescribed period and can be substituted with such a component as a buffer (not shown in the drawing) and the like.

In the above-mentioned detailed configurations of the base station device 1910 and the user equipment device 1920, the contents or items explained in the descriptions of the various embodiments of the present invention may be independently applicable or at least two embodiments of the present invention may be simultaneously applicable. And, redundant descriptions shall be omitted from the following description for clarity.

The description of the base station device 1910 with reference to FIG. 19 may be identically applicable to a relay node device as a DL transmitting entity or a UL receiving entity. And, the description of the user equipment device 1920 with reference to FIG. 19 may be identically applicable to a relay node device as a UL transmitting entity or a DL receiving entity.

Embodiments of the present invention can be implemented using various means. For instance, embodiments of the present invention can be implemented using hardware, firmware, software and/or any combinations thereof.

In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

The embodiments of the present invention mentioned in the foregoing description are applicable to various kinds of mobile communication systems.

What is claimed is:

1. A method of a base station transmitting a downlink control channel to a user equipment, the method comprising:
    determining a type of a downlink subframe;
    setting a number of OFDM (orthogonal frequency division multiplexing) symbols used for the downlink control channel to a predefined value and transmitting the downlink control channel via the OFDM symbols when the downlink subframe corresponds to a first type subframe; and
    transmitting information about a number of OFDM symbols used for the downlink control channel via a PCFICH (physical control format indicator channel) and transmitting the downlink control channel via the OFDM symbols when the downlink subframe corresponds to a second type subframe.

2. The method of claim 1, wherein the predefined value is indicated by higher layer signaling.

3. The method of claim 1, wherein the downlink control channel comprises at least a PDCCH (physical downlink control channel) or an E-PDCCH (Enhanced-PDCCH).

4. The method of claim 1, wherein:
    the first type subframe comprises a subframe on which an inter-cell interference coordination is performed by a neighboring cell; and
    the second type subframe comprises a subframe on which the inter-cell interference coordination is not performed by the neighboring cell.

5. The method of claim 4, wherein the subframe on which the inter-cell interference coordination is performed comprises a subframe configured by the neighboring cell as an ABS (almost blank subframe), a MBSFN (multicast broadcast single frequency network) subframe, or an ABS-with-MBSFN subframe.

6. A base station (BS) for transmitting a downlink control channel, the BS comprising:
    a receiving module configured to receive an uplink signal from a user equipment (UE);
    a transmitting module configured to transmit a downlink signal to the UE; and a processor configured to:

determine a type of a downlink subframe;

set a number of OFDM (orthogonal frequency division multiplexing) symbols used for the downlink control channel to a predefined value and transmit the downlink control channel via the OFDM symbols when the downlink subframe corresponds to a first type subframe; and transmit information about the number of OFDM symbols used for transmitting the downlink control channel via a PCFICH (physical control format indicator channel) and transmit the downlink control channel via the OFDM symbols when the downlink subframe corresponds to a second type subframe.

7. The BS of claim 6, wherein the predefined value is indicated by higher layer signaling.

8. The BS of claim 6, wherein the downlink control channel comprises at least a PDCCH (physical downlink control channel) or an E-PDCCH (Enhanced-PDCCH).

9. The BS of claim 6, wherein:

the first type subframe comprises a subframe on which an inter-cell interference coordination is performed by a neighboring cell; and the second type subframe comprises a subframe on which the inter-cell interference coordination is not performed by the neighboring cell.

10. The BS of claim 9, wherein the subframe on which the inter-cell interference coordination is performed comprises a subframe configured by the neighboring cell as an ABS (almost blank subframe), a MBSFN (multicast broadcast single frequency network) subframe, or an ABS-with-MBSFN subframe.

* * * * *